United States Patent
Tashiro et al.

(10) Patent No.: US 10,449,780 B2
(45) Date of Patent: Oct. 22, 2019

(54) PRINTER AND PRINTING METHOD WHICH VARIES AREA PRINTABLE IN ONE-PASS PRINTING

(71) Applicant: Ricoh Company, Ltd., Tokyo (JP)

(72) Inventors: Ryo Tashiro, Kanagawa (JP); Masahiro Kido, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 15/916,508

(22) Filed: Mar. 9, 2018

(65) Prior Publication Data

US 2018/0257388 A1   Sep. 13, 2018

(30) Foreign Application Priority Data

Mar. 10, 2017  (JP) ................................. 2017-046723
Mar. 7, 2018   (JP) ................................. 2018-040588

(51) Int. Cl.
*B41J 2/21*    (2006.01)
*B41J 2/155*   (2006.01)
*C09D 11/105*  (2014.01)

(52) U.S. Cl.
CPC ............ *B41J 2/2117* (2013.01); *B41J 2/155* (2013.01); *C09D 11/105* (2013.01)

(58) Field of Classification Search
CPC ........ B41J 2/2117; B41J 2/155; C09D 11/105
See application file for complete search history.

(56) References Cited

U.S. PATENT DOCUMENTS

| 2011/0141173 A1* | 6/2011 | Usuda ................... B41J 2/2114 347/12 |
| 2013/0021401 A1* | 1/2013 | Okuda ................... B41J 2/2117 347/15 |
| 2016/0361919 A1 | 12/2016 | Hashimoto |
| 2017/0157921 A1 | 6/2017 | Tashiro et al. |

FOREIGN PATENT DOCUMENTS

| JP | 2011-143704 | 7/2011 |
| JP | 2011-143706 | 7/2011 |
| JP | 2013-035130 | 2/2013 |
| JP | 2017-217810 | 12/2017 |

OTHER PUBLICATIONS

Extended European Search Report dated Jul. 12, 2018 in European Patent Application No. 18160776.3, 9 pages.

* cited by examiner

*Primary Examiner* — Henok D Legesse
(74) *Attorney, Agent, or Firm* — Xsensus LLP

(57) ABSTRACT

A printer includes a liquid discharge head and a processor. The liquid discharge head includes a plurality of nozzles. The plurality of nozzles include a line of first nozzles to discharge first liquid and a line of second nozzles to discharge second liquid. The processor is configured to change a print speed in a print mode in which a preceding image is formed with at least the first liquid and a subsequent image to be superimposed on the preceding image is formed with the second liquid, in accordance with an amount of liquid applied to a recording medium to form the preceding image.

17 Claims, 15 Drawing Sheets

PRINTER AND PRINTING METHOD WHICH VARIES AREA PRINTABLE IN ONE-PASS PRINTING

CROSS-REFERENCE TO RELATED APPLICATIONS

This patent application is based on and claims priority pursuant to 35 U.S.C. § 119(a) to Japanese Patent Application Nos. 2017-046723, filed on Mar. 10, 2017, and 2018-040588, filed on Mar. 7, 2018, in the Japan Patent Office, the entire disclosure of each of which is hereby incorporated by reference herein.

BACKGROUND

Technical Field

This disclosure relates to a printer and a printing method.

Related Art

There are printers capable of a so-called front printing mode, in which a main image is printed with color ink after a backing image (i.e., a background image) is printed with white image; and a so-called back printing mode, in which a backing image is printed with white ink after a main image is printed with color ink.

SUMMARY

According to an embodiment of this disclosure, a printer includes a liquid discharge head and a processor. The liquid discharge head includes a plurality of nozzles. The plurality of nozzles include a line of first nozzles to discharge first liquid and a line of second nozzles to discharge second liquid. The processor is configured to change a print speed in a print mode in which a preceding image is formed with at least the first liquid and a subsequent image to be superimposed on the preceding image is formed with the second liquid, in accordance with an amount of liquid applied to a recording medium to form the preceding image.

Another embodiment provides a printing method includes discharging first liquid from a line of first nozzles of a liquid discharge head and second liquid from a line of second nozzles of the liquid discharge head; and changing a print speed in a print mode in which a preceding image is formed with at least the first liquid and a subsequent image to be superimposed on the preceding image is formed with the second liquid, in accordance with an amount of liquid applied to a recording medium to form the preceding image.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

Figure 1:
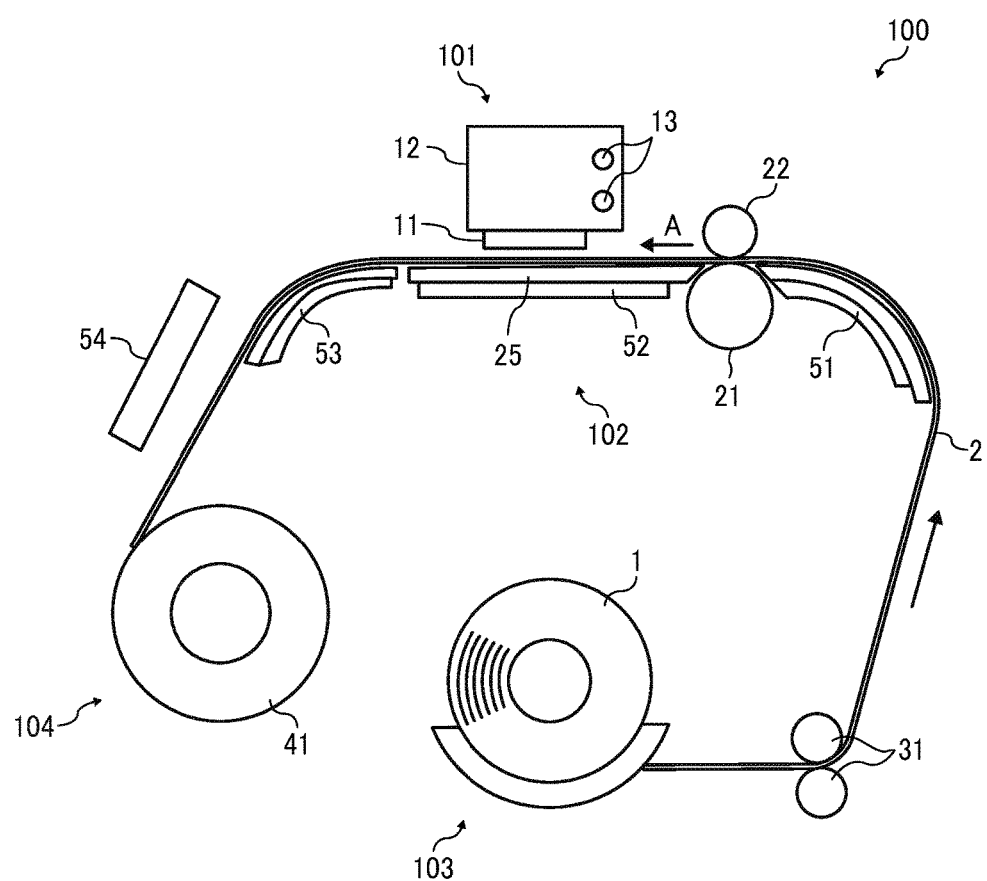
FIG. 1 is a side view of a printer according to an embodiment of this disclosure.

The accompanying drawings are intended to depict embodiments of the present invention and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner and achieve a similar result.

Referring now to the drawings, wherein like reference numerals designate identical or corresponding parts throughout the several views thereof, and particularly to FIG. 1, an image forming apparatus according to an embodiment of this disclosure is described. As used herein, the singular forms "a", "an", and "the" are intended to include the plural forms as well, unless the context clearly indicates otherwise.

Printer and Printing Method

According to an embodiment of the present disclosure, a printer includes a liquid discharge head including a first nozzle line to discharge first liquid to form a first image and a second nozzle line to discharge second liquid to form a second image, the liquid discharge head configured to form a preceding image with at least one of the first liquid and the second liquid and a subsequent image with at least the other of the first liquid and the second liquid; and a print speed changer, such as a processor, configured to change a print speed of the subsequent image in accordance with an amount of liquid applied in the preceding image. According to an embodiment of the present disclosure, a printing method includes discharging a first liquid from a first nozzle line of a liquid discharge head and a second image from a second nozzle line of the liquid discharge head; and changing a print speed of a subsequent image in accordance with an amount of liquid applied in a preceding image preceding the subsequent image when forming the preceding image with at least one of the first liquid and the second liquid and the subsequent image with at least the other of the first liquid and the second liquid.

The above-described printer or printing method can solve a problem that simply increasing the print speed in the back printing from the print speed in the front printing may cause an inconvenience that, for example, in a case of a main image printed with a relatively large amount of liquid, a background image may be printed before the main image dries and thus degrade the image quality. Accordingly, the above-described printer or printing method can increase the print speed and image quality in a print mode in which images are superimposed one on another.

Figure 2:
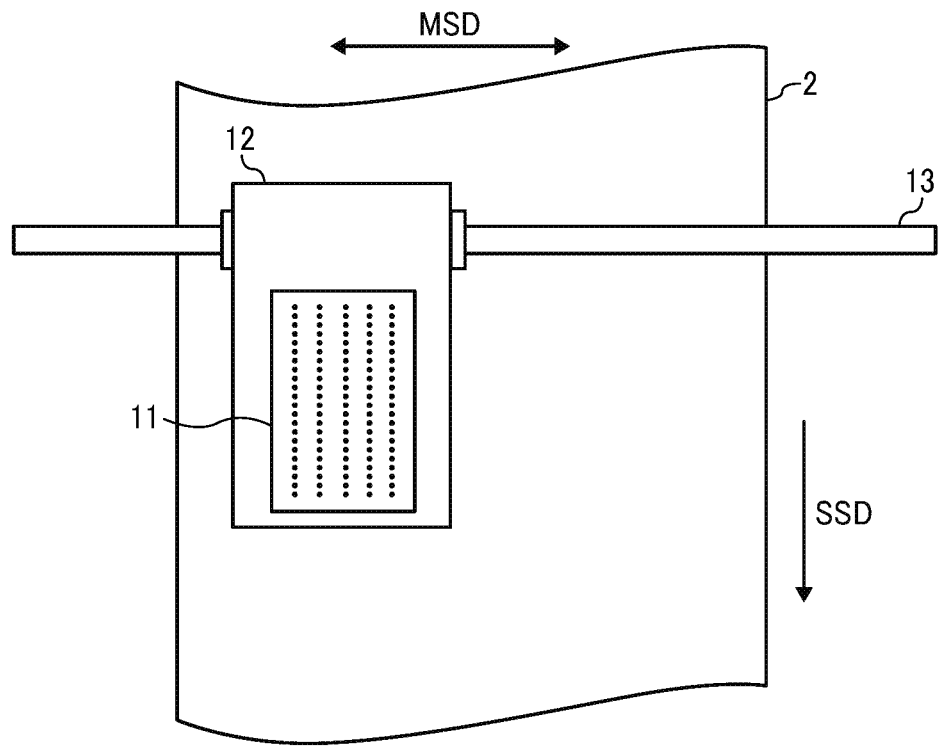
FIG. 2 is a plan view of a main portion of a printer according to an embodiment of this disclosure.
Figure 3:
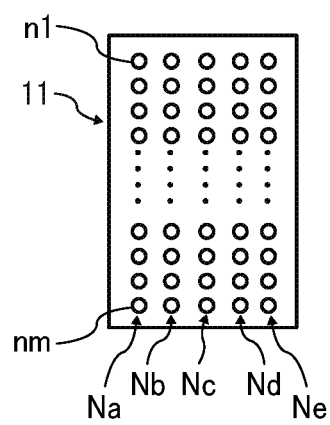
FIG. 3 is a plan view of a printer according to an embodiment of this disclosure.

In the following, embodiments of the present invention will be described with reference to the accompanying drawings. A printer according to an embodiment of the present disclosure is described with reference to FIGS. 1 to 3. FIG. 1 is a side view of the printer according to the present embodiment. FIG. 2 is a plan view of a main portion of the printer illustrated in FIG. 1. FIG. 3 is a plan view of a head of the printer illustrated in FIG. 1.

A printer 100 illustrated in FIG. 1 is a serial type inkjet recording apparatus and includes a printing unit 101 (an image forming device) to form an image on a recording medium 2, a conveyor 102 to convey the recording medium 2, a roll mount 103 on which the recording medium 2 is mounted, and a reel 104 to reel in the recording medium 2.

The printer 100 uses a roll 1 of the recording medium 2. The roll 1 is mounted on the roll mount 103, and a conveyance roller pair 31 draws out the recording medium 2 from the roll 1.

The printing unit 101 includes a liquid discharge head (hereinafter may also referred to as "head 11") having a plurality of lines (rows) of nozzles to discharge liquid and a carriage 12 on which the head 11 is mounted. The carriage 12 is supported movably back and forth in a main scanning direction (perpendicular to the paper surface or screen on which FIG. 1 is drawn) by guide rods 13.

As illustrated in FIG. 3, the head 11 includes a plurality of nozzle lines Na, Nb, Nc, Nd, and Ne each having a plurality of (number m) nozzles n1 to nm to discharge liquid (i.e., ink). The head 11 is mounted on the carriage 12 with the nozzle array direction oriented in the direction of conveyance of the recording medium 2 (i.e., a sub-scanning direction), which is also referred to as "nozzle array direction".

In the head 11, for example, the nozzle lines Na to Nd serve as first nozzle lines that are used to discharge color liquids (i.e., first liquids) such as black (K), yellow (Y), magenta (M), and cyan (C) inks to form a color image serving as a first image. The nozzle line Ne of the head 11 serves as a second nozzle line used to discharge white (W) ink (i.e., second liquid) to form a background image (i.e., a second image). Although one head includes the five nozzle rows Na to Ne in the present embodiment, a configuration in which a plurality of nozzle rows are distributed to a plurality of heads may be alternatively employed.

The conveyor 102 includes a conveyance roller 21 and an opposing roller 22 disposed upstream from the printing unit 101 in the direction of conveyance of the recording medium 2, indicated by arrow A (hereinafter also "medium conveyance direction A"), which parallels the sub-scanning direction indicated by arrow SSD in FIG. 2. The conveyance roller 21 and the opposing roller 22 together nip and convey the recording medium 2. The conveyor 102 further includes a platen 25 disposed opposite the printing unit 101, to guide the recording medium 2.

The reel 104 includes a reeling roller 41 to reel in the recording medium 2.

The printer further includes a preheater 51, a print heater 52, and a post heater 53 disposed along the direction of conveyance of the recording medium 2.

The preheater 51 heats the recording medium 2 upstream from a print range of the printing unit 101 in the medium conveyance direction A. The print heater 52 is a heater to heat the recording medium 2 in the print range of the printing unit 101. The post heater 53 is a heater to heat the recording medium 2 after printing by the printing unit 101 is made. Each of the preheater 51, the print heater 52, and the post heater 53 can be an electrothermal heater using ceramic or nichrome wires.

Downstream from the post heater 53 in the medium conveyance direction A, a hot-air fan 54 is disposed to apply hot air to the recording medium 2. The hot-air fan 54 directly applies hot air to the liquid on the surface of the recording medium 2, thereby reducing the humidity of the atmosphere to completely dry the liquid.

Heating with the preheater 51, the print heater 52, the post heater 53, and the hot-air fan 54 enables printing on impermeable recording media, such as vinyl chloride, polyethylene terephthalate (PET), and acrylic resin, impermeable to liquid. Use of solvent-based liquid and aqueous resin-based liquid having a high resin content can secure preferable fixation on such impermeable recoding media.

Figure 4:
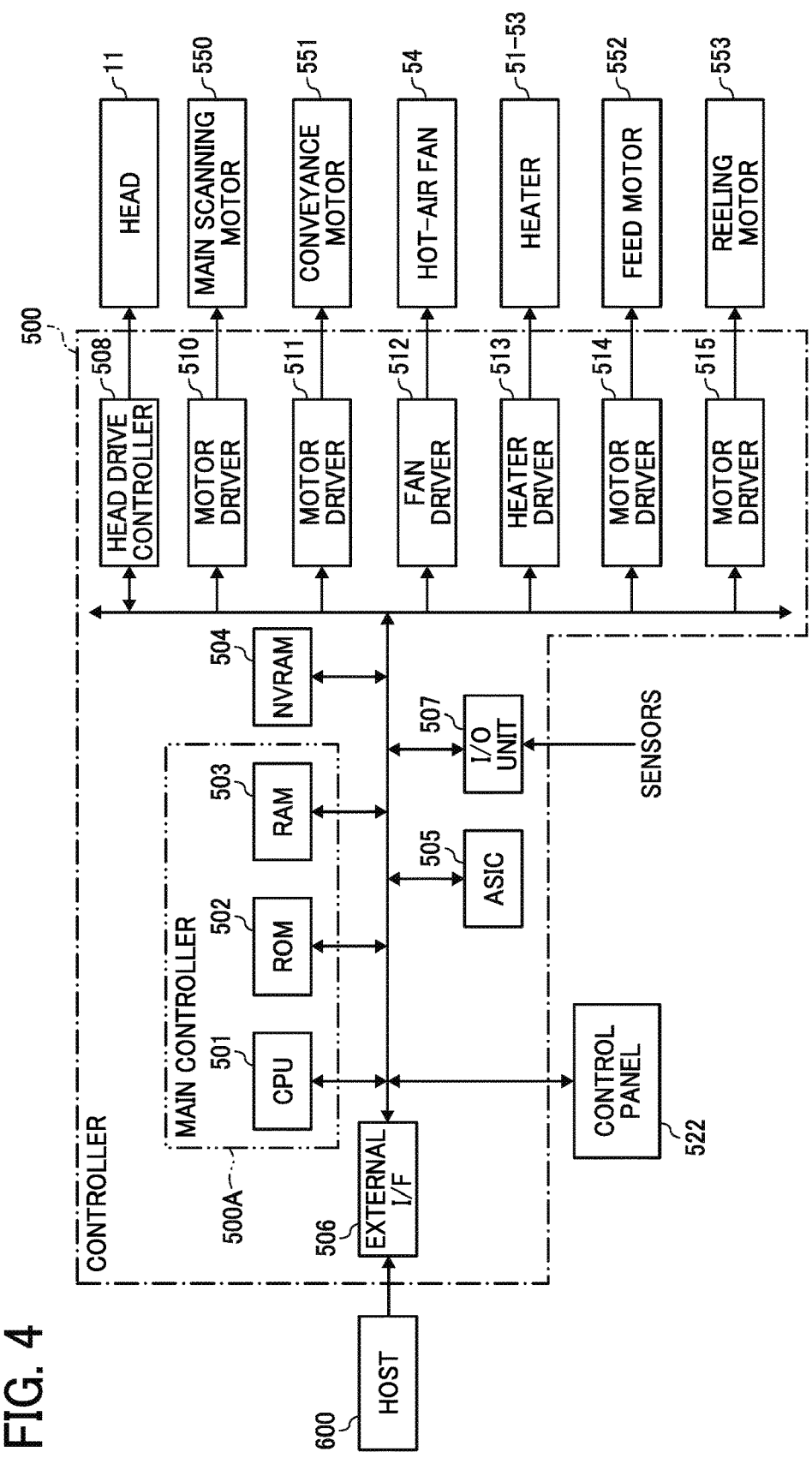
FIG. 4 is a block diagram of a controller of the printer illustrated in FIG. 1.

Next, a controller 500 of the printer 100 is described with reference to FIG. 4.

The controller 500 includes a main controller 500A including a central processing unit (CPU) 501, a read-only memory (ROM) 502, and a random access memory (RAM) 503. The CPU 501 controls the entire printer 100. The ROM 502 stores programs, which include a program to cause the CPU 501 to perform the control, and other fixed data. The RAM 503 temporarily stores print data and the like.

The controller 500 includes a nonvolatile RAM (NVRAM) 504 for holding data while the power of the printing apparatus is off. In addition, the controller 500 includes an application specific integrated circuit (ASIC) 505 configured to perform image processing, in which various signals related to image data is processed, and process other input/output signals for performing overall control of the printing apparatus.

The controller 500 further includes an external interface (I/F) 506 to send and receive data and signals used in receiving print data from a host 600 (an external device).

The controller 500 includes an input-and-output (I/O) 507 for receiving detection signals from various sensors.

The controller 500 includes a head drive controller 508 configured to control the driving of the head 11.

The controller 500 further includes a motor driver 510 to drive a main scanning motor 550 to move the carriage 12 in the main-scanning direction (indicated by arrow MSD in FIG. 2) and a motor driver 511 to drive a conveyance motor 551 to drive the conveyance roller 21.

The controller 500 includes a fan driver 512 to drive the hot-air fan 54 and a heater driver 513 to drive the preheater 51, the print heater 52, and the post heater 53.

The controller 500 further includes motor drivers 514 and 515. The motor driver 514 drives a feed motor 552 to reel out the recording medium 2 from the roll 1 mounted on the roll mount 103. The motor driver 515 drives a reeling motor 553 to reel in the recording medium 2 with the reeling roller 41 of the reel 104.

The controller 500 is coupled to a control panel 522 for inputting and displaying information necessary for the printing apparatus.

Figure 5:
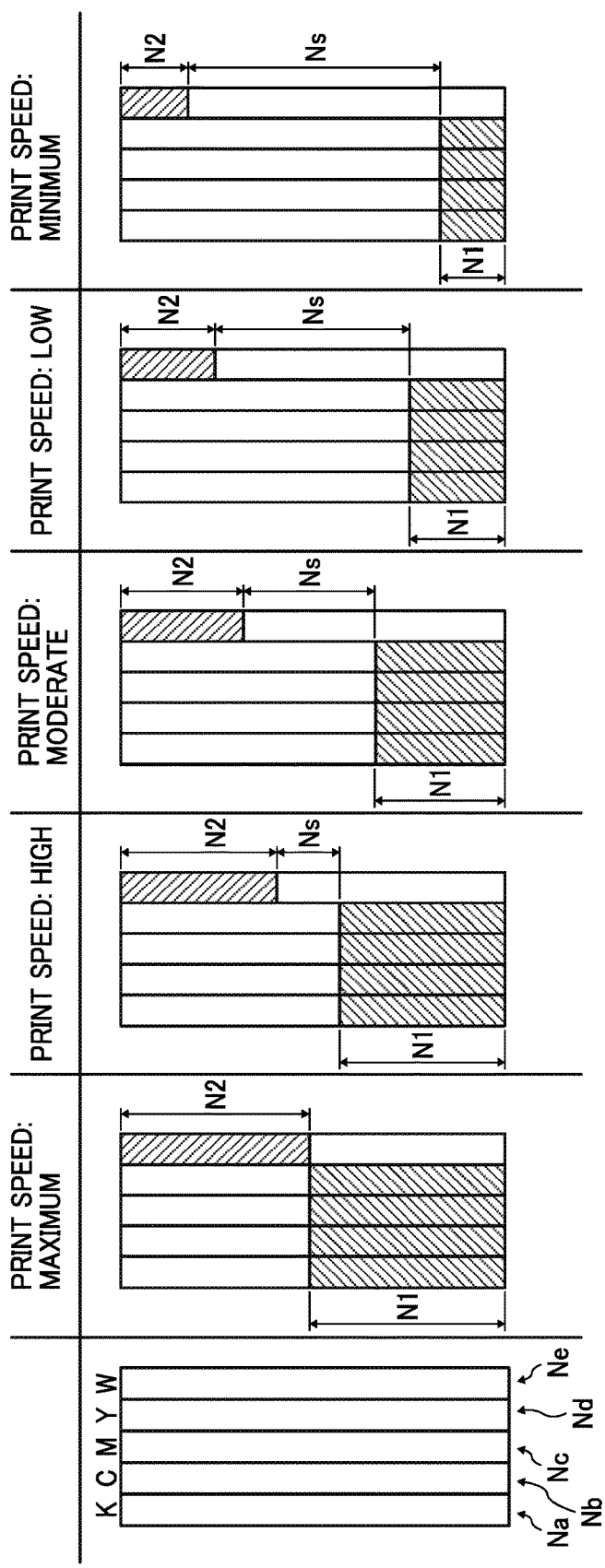
FIGS. 5A through 5F are plan views of a head structure according to Embodiment 1 and illustrate relations between nozzle allocation and print speed in a first mode (background-first mode)
Figure 6:
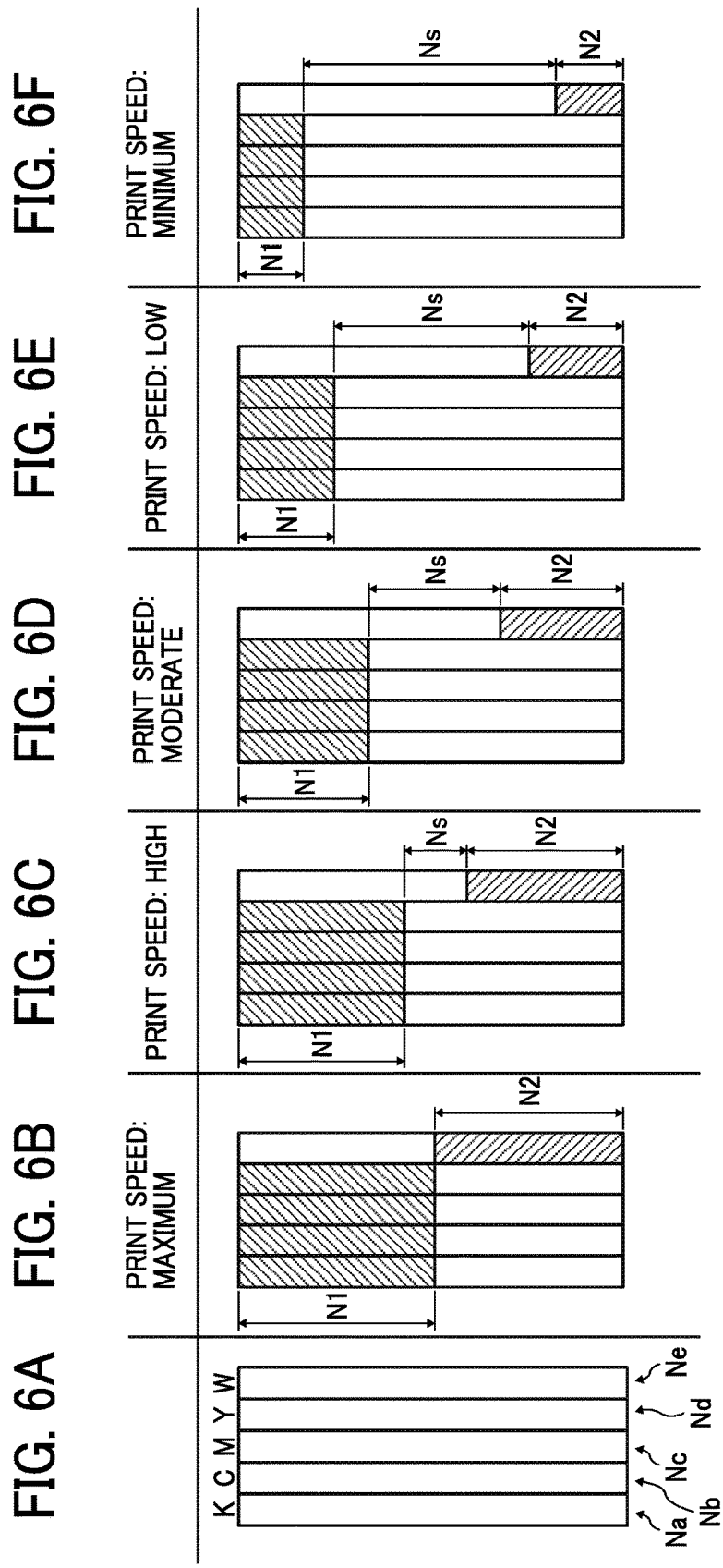
FIGS. 6A through 6F are plan views of another head structure according to Embodiment 1 and relations between nozzle allocation and print speed in a second mode (image-first mode)

Next, Embodiment 1 of the present disclosure will be described with reference to FIGS. 5 and 6. With reference to FIG. 5, descriptions are given below of a head structure and a relation between nozzle allocation and print speed in a first mode (background-first mode) where the second image is formed with the second liquid (white ink) before the first image is formed with the first liquid (color ink). With reference to FIG. 6, descriptions are given below of a head structure and a relation between nozzle allocation and print speed in a second mode (image-first mode) where the first image is formed with the first liquid before the second image is formed with the second liquid.

In the present embodiment, the head 11 includes the nozzle lines Na to Ne as illustrated in FIGS. 5A and 6B. Each of the nozzle lines Na to Nd includes a line of first nozzles (hereinafter "first nozzle range N1") to discharge one of color inks (including black ink) serving as the first liquids. The nozzle line Ne includes a line of second nozzles (hereinafter second nozzle range N2) to discharge white ink serving as the second liquid. Note that although references K, C, M, Y, and W representing the ink colors are given to nozzle lines Na to Ne in FIGS. 5A and 6A, the liquids discharged are not limited thereto.

In this example, the recording medium 2 is transparent film made of, for example, PET, the second image is formed with white ink as the background image, and the first image is formed with color ink as the main image. Alternatively, the background image can be formed with at least one color ink, and the main image can be formed with white ink. Yet alternatively, instead of or in addition to black (K), cyan (C), magenta (M), yellow (Y), and white (W) inks, special color liquid such as orange, red, violet, green blue, silver, pearl, gold, or transparent liquid (clear ink) can be used.

The nozzle lines Na to Nd include the first nozzle range N1 of first nozzles to discharge the color inks, and the nozzle line Ne includes the second nozzle range N2 of second nozzles to discharge white ink. Of the nozzle lines Na to Ne, the group of nozzles not used to discharge the color inks or the while ink is referred to as disused nozzles, and a range of the disused nozzles common to the plurality of nozzle lines is referred to as a dry range Ns.

Referring to FIGS. 5B to 5F, descriptions are given below of nozzle allocation in the first mode (background-first, white undercoat, or front printing mode) in which the background image with white ink (the second image) is printed before the main image (the first image) is printed with the color image.

In the description below, the ratio of the number of nozzles in the first nozzle range N1 (to discharge the first liquid or color ink) to the number of nozzles in the second nozzle range N2 (to discharge the second liquid or white ink) is 1:1.

Of the example structures illustrated in FIGS. 5B to 5F, the number of nozzles used to discharge ink is greatest in the nozzle allocation illustrated in FIG. 5B, and the print speed is maximum in the nozzle allocation illustrated in FIG. 5B. However, there is a risk that the first image (the main image) is printed with the color ink before the second image (the background image) with the white ink dries. In such a case, the color ink partly sinks in the second image with the white ink, and a desired dot diameter is not attained.

In view of the foregoing, in the examples illustrated in FIGS. 5C to 5F, in the nozzle array direction, the disused nozzles are interposed between the first nozzle range N1 and the second nozzle range N2, so that the disused nozzles provide the dry range Ns. With the dry range Ns, the first liquid is discharged after drying of the second image progresses. Accordingly, the first liquid is inhibited from sinking in the second image, thereby inhibiting creation of substandard images and improving image quality.

The number of nozzles used to discharge ink decreases in the order of FIGS. 5C, 5D, 5E, and 5F. As the number of nozzles used decreases, an area printable by one-pass scanning decreases, and the print speed decreases.

Of the allocation examples illustrated in FIGS. 5C to 5F, the print speed is fastest while substandard images are not created when the nozzles are allocated as illustrated in FIG. 5D, that is, the ratio of the number of nozzles among the second nozzle range N2 (to discharge the white ink), the dry range Ns, and the first nozzle range N1 is 1:1:1. The print speed may be set according to both the type of the second liquid, which is described later, and the amount of adhesion of the second liquid per unit area. For example, in a case in which the print speed is desirable according to the type of the second liquid and various images greatly differing in maximum adhesion amount are printed, typically, only a moderate print speed can be selected in consideration of a case in which the maximum adhesion amount is high. However, according to the present embodiment, the print speed can be set according to the amount of adhesion per unit area, thus enhancing the degree of freedom in selection of liquid.

Next, referring to FIGS. 6B to 6F, descriptions are given below of nozzle allocation in the second mode (image-first, white overcoat, or back printing mode) in which the background image with white ink (the second image) is printed after the main image (the first image) is printed with the color image.

In the allocation examples illustrated in FIGS. 6B to 6F, similar to those illustrated in FIGS. 5B to 5F, the number of nozzles used to discharge ink decreases in the order of FIGS. 6C, 6D, 6E, and 6F. As the number of nozzles used decreases, an area printable by one-pass scanning decreases, and the print speed decreases.

Generally, since the main image is smaller in ink amount or coating area than the background image, the print speed can be made faster in the second mode (image-first mode) is faster than that in the first mode when the sequence (the number of pass, the number of interlace, resolution, etc.) is same.

For example, in the second mode, no substandard image is created even when the nozzles are allocated as illustrated in FIG. 6C (N2:Ns:N1 =5:2:5). Compared with the nozzle allocation illustrated in FIG. 5D with which the print speed is fastest while substandard image is inhibited in the first mode, the nozzle allocation illustrated in FIG. 6C can increase the print speed.

When the amount of the first liquid applied to the recording medium (amount of adhesion of the first liquid) to form the main image (the first image) formed earlier is relatively large, however, there is a risk of smearing or feathering between the white ink and the color ink or other image failure. A similar inconvenience can occur when the dry speed of the color ink is low. Therefore, simply increasing the print speed in the second mode compared with the print speed in the first mode can result in image quality degradation.

In view of the foregoing, in the present embodiment, the print speed in the second mode is changed in accordance with the amount of liquid applied to form the first image in the first mode. Hereinafter, the amount of liquid applied is also simply referred to as "ink amount".

It is assumed that, when the main image is formed with color ink as a solid image (the ink amount is largest) before the background image is formed with white ink, no substandard image is created when the ratio of the number of nozzles among the second nozzle range N2 (white ink), the disused nozzles (dry range Ns), and the first nozzle range N1 (color ink) is set as 1:2:1.

It is further assumed that, in a case where a possible smallest ink amount is, for example, one tenth (1/10) of the largest ink amount, no substandard image is created when the ratio of the number of nozzles among the second nozzle range N2 (white ink), the disused nozzles (dry range Ns), and the first nozzle range N1 (color ink) is set as 2:1:2.

In a case where the number of nozzles for one color line is 200, allocation of nozzles among the second nozzle range N2 (white ink), the disused nozzles (dry range Ns), and the first nozzle range N1 (color ink) satisfies the ratio expressed as N2:Ns:N1 =50:100:50 for the largest ink amount and satisfies the ratio expressed as N2:Ns:N1 =80:40:80 for one tenth (1/10) of the largest ink amount, which is the smallest ink amount.

Assuming that the number of nozzles used is negatively correlated to the ink amount (i.e., amount of liquid applied), the nozzles are allocated to satisfy the relation expressed as N2(white):Ns(dry):N1(color)=70:60:70 for four tenth (4/10) the largest ink amount and satisfy the ratio expressed as N2(white):Ns(dry):N1(color)=60:80:60 for seven tenth (7/10) of the largest ink amount. The term "negatively correlated" used herein means that as the amount of liquid applied increases, it takes more time to dry the applied liquid, which requires reducing the number of nozzles used.

In other words, the number of nozzles used is changed (increased or reduced) to change the area printable by one-pass scanning, thereby changing the print speed. Note that the increments or decrements of the number of nozzles used is not limited to 10 but can be 1 or greater than 1. Incrementing or decrementing the number of nozzles used by one by one enables printing at an optimum print speed.

When the numbers of the first nozzle range N1, the second nozzle range N2, and the disused nozzles (dray range Ns) are either identical to each other or in a relation of integral multiple, the first image and the second image can be formed under conditions of an identical resolution and an identical number of pass.

Figure 7:
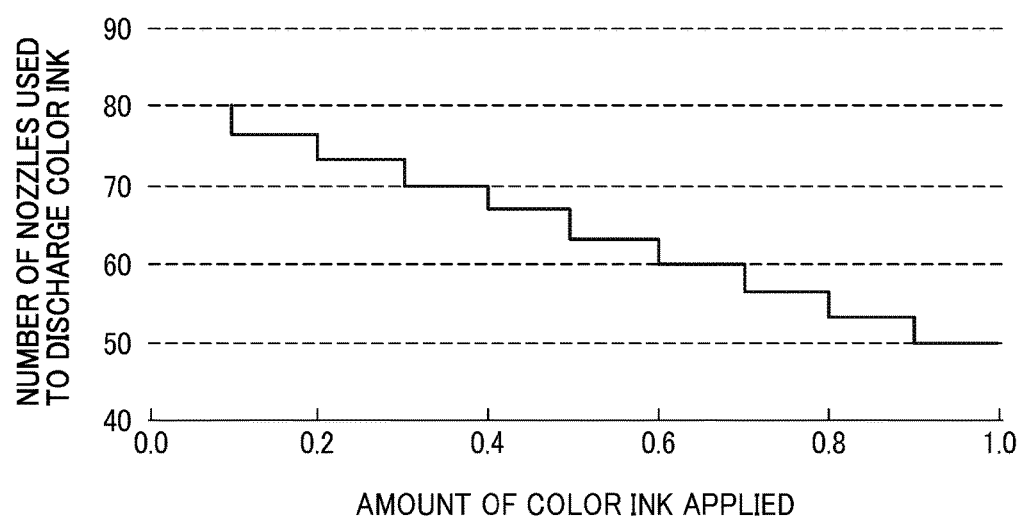
FIG. 7 is a graph illustrating an example change of the number of nozzles used to discharge color ink in response to changes in the amount of color ink applied when a maximum amount of color ink applied is "1"

FIG. 7 is a graph illustrating an example change of the number of nozzles used to discharge color ink in response to the change in the ink amount when the largest amount of color ink applied is "1". According to FIG. 7, as the amount of ink applied decreases, the number of nozzles used is increased, that is, the print speed is increased.

In this case, the ink amount used as the criteria for changing the print speed, that is, the number of nozzles used, can be the amount of liquid applied in the entire printable area of the recording medium to form a preceding image or the amount of liquid applied, per unit area, in a high density portion (having a predetermined density or greater) to form the preceding image.

To inhibit image failure in the entire printable area to attain a higher image quality, the number of nozzles is preferably changed based on the ink amount in a high density portion.

By contrast, when the high density portion is extremely small or is an indistinctive image portion, changing the number of nozzles based on the ink amount in the entire recording medium (entire printable area thereof), which is a mild criteria, is advantageous in increasing the print speed.

Therefore, for example, the controller 500 stores the correlation between the ink amount and the number of nozzles in a memory, calculates the ink amount in image processing by a raster image processor (RIP) or a printer driver, and checks the calculated ink amount with the stored data to determine the number of nozzles used. With this operation, printing can be performed at a highest print speed with image failure inhibited in accordance with the ink amount in the preceding image.

Note that, although the description above concerns changing print speed in accordance with the ink amount of the preceding image in the second mode (image-first mode), alternatively, the print speed can be changed in accordance with the ink amount of the preceding image in the first mode (background-first mode). Yet alternatively, the print speed can be changed in accordance with the ink amount of the preceding image in both the first mode (background-first mode) and the second mode (image-first mode).

Next, Embodiment 2 of the present disclosure is described with reference to FIGS. 8A to 8D. With reference to FIGS. 8A to 8D, descriptions are given below of a head structure and a relation between nozzle allocation and print speed in the second mode (image-first mode) where the first image is formed with the first liquid before the second image is formed with the second liquid.

Figure 8:
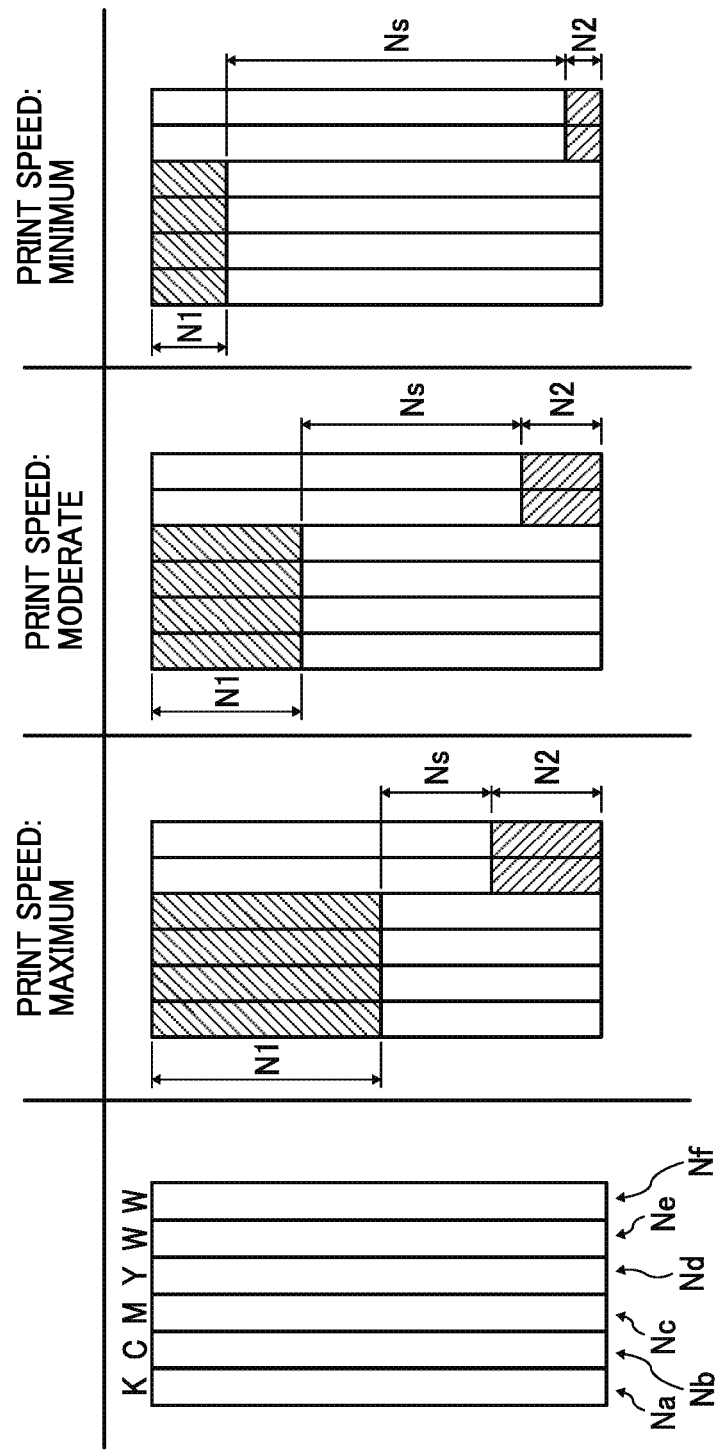
FIGS. 8A through 8D are plan views of a head structure according to Embodiment 2 and illustrate relations between nozzle allocation and print speed in second mode (image-first mode)

In the present embodiment, the head 11 includes six nozzle lines Na to Nf as illustrated in FIG. 8A. The nozzle lines Na to Nd include first nozzle range N1 to discharge color inks (including black ink) serving as the first liquids. The nozzle lines Ne and Nf include lines of second nozzle range N2 to discharge white ink serving as the second liquid.

With this structure, compared with Embodiment 1 in which one nozzle line is used to discharge the white ink, the amount of white ink discharged in one-pass scanning doubles. When the ink amount (amount of liquid applied) is identical to that in Embodiment 1, the number of nozzles per nozzle line is simply reduced by half and two lines of nozzles are used for white ink (second liquid). In other words, the ratio of the length of the first nozzle range N1 to the length of the second nozzle range N2 is expressed as 2:1.

Then, as illustrated in FIG. 8B, even when the ink amount is similar to that in FIG. 6B of Embodiment 1, the nozzle allocation among the first nozzle range N1, the second nozzle range N2, and the disused nozzles (dray range Ns) is expressed as N2(white):Ns(dry):N1(color)=1:1:2. Thus, the dry range Ns is maintained. Similarly, when the number of nozzles in the first nozzle range N1 is similar to that illustrated in FIGS. 6D and 6F (Embodiment 1) as illustrated in FIGS. 8C and 8D, the dry range Ns can be made longer.

In a case where the amount of white ink applied is increased to enhance the rate of covering, the number of nozzles in the first nozzle range N1 per line is made identical to the number of nozzles in the second nozzle range N2 per line so that the amount of white ink applied is twice as large as that of color ink. In this case, however, the amount of white ink applied is greater compared with the structure in which the number of lines of the second nozzle range N2 is one. Therefore, increasing the dry range Ns in the first mode (background-first mode) is preferred.

Next, Embodiment 3 of the present disclosure is described with reference to FIGS. 9A through 9F. With reference to FIGS. 9A through 9F, descriptions are given below of a head structure and a relation between nozzle allocation and print speed in the second mode (image-first mode) where the first image is formed with the first liquid before the second image is formed with the second liquid.

Figure 9:
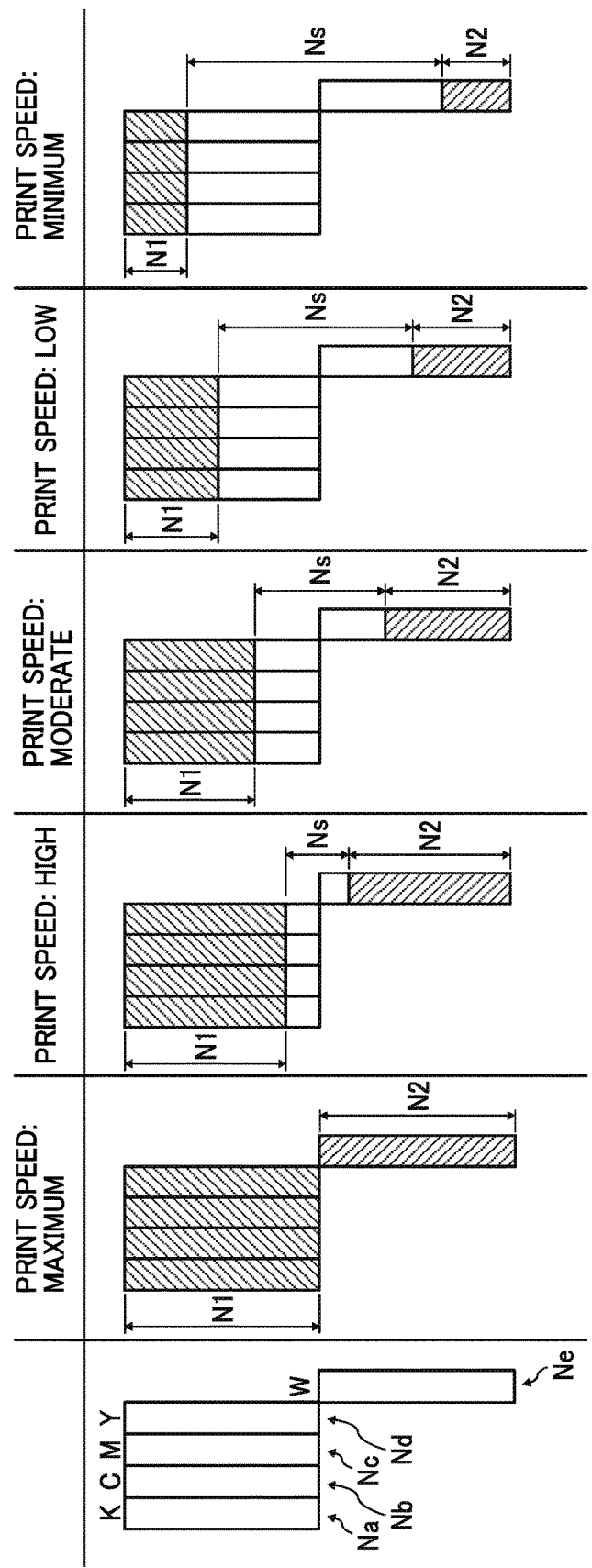
FIGS. 9A through 9F are plan views of a head structure according to Embodiment 3 and illustrate relations between nozzle allocation and print speed in the second mode (image-first mode)

As illustrated in FIG. 9A, in the present embodiment, the nozzle lines Na to Nd used as the first nozzle range N1 are shifted from the nozzle line Ne used as the second nozzle range N2 in the nozzle array direction.

In the structure illustrated in FIG. 9A, the number of nozzles in each of the nozzle lines Na to Ne is half the number of nozzles in each nozzle line in Embodiment 1, and the nozzle lines Na to Nd is shifted from the nozzle line Ne by the length of one nozzle line in the nozzle array direction.

However, the length by which the nozzle line Ne to discharge white ink (second liquid) is shifted from the nozzle lines Na to Nd to discharge color ink (first liquid) is not limited thereto. As long as the nozzle line Ne is shifted from the nozzle lines Na to Nd by haft the length of the nozzle lines Na to Nd or longer in the nozzle array direction, the nozzles can be efficiently used in the second mode.

As illustrated in FIGS. 9B to 9F, the ratio of nozzles allocated among the first nozzle range N1 (color ink), the disused nozzles (dray range Ns), and the second nozzle range N2 (white ink) is changed to change the print speed.

Next, Embodiment 4 of the present disclosure is described with reference to FIGS. 10A through 10D. With reference to FIGS. 10A through 10D, descriptions are given below of a head structure and a relation between nozzle allocation and print speed in the second mode (image-first mode) where the first image is formed with the first liquid before the second image is formed with the second liquid.

Figure 10:
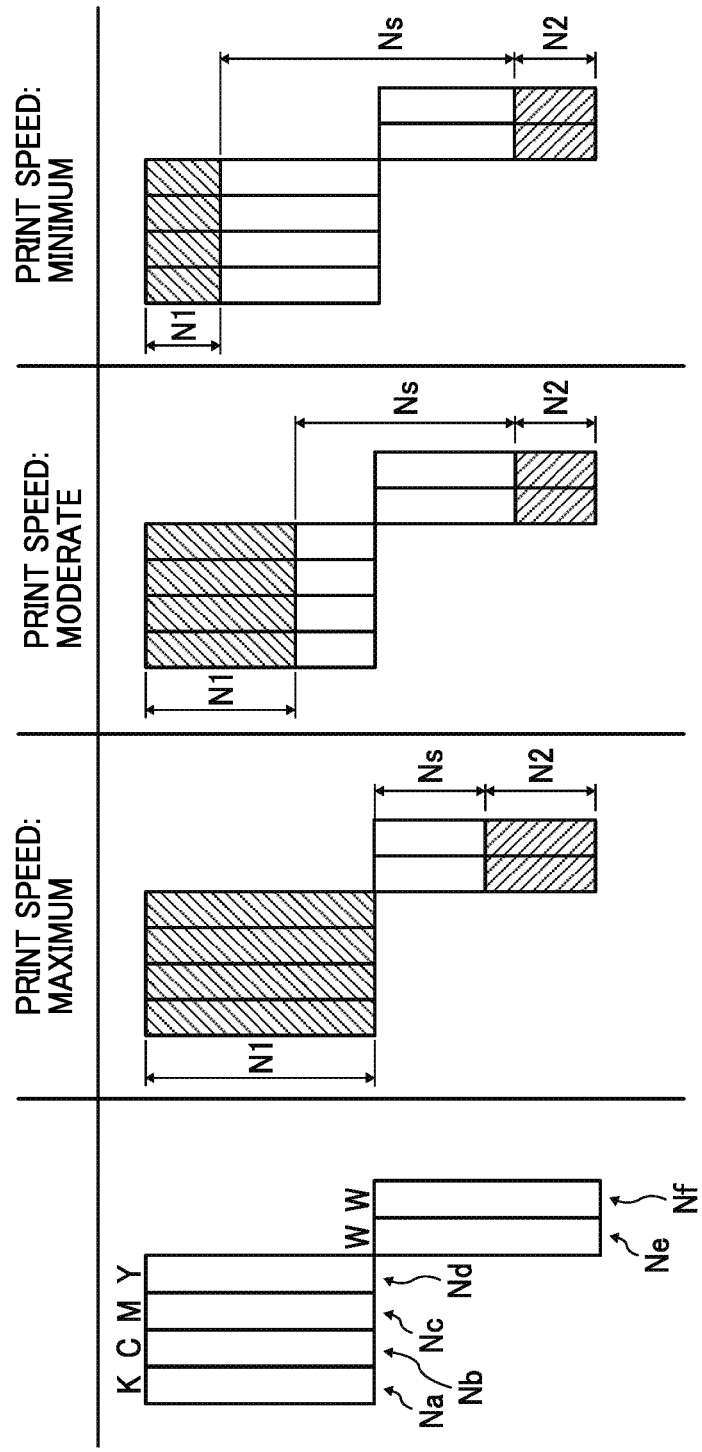
FIGS. 10A through 10D are plan views of a head structure according to Embodiment 4 and illustrate relations between nozzle allocation and print speed in the second mode (image-first mode)

For the head structure of the present embodiment, as illustrated in FIG. 10A, two nozzle lines 11e and 11f used as the second nozzle range N2 are disposed in the configuration according to Embodiment 3, similarly with the configuration according to Embodiment 2.

With this configuration, effects similar to those attained by Embodiment 2 can be attained in the configuration according to Embodiment 3.

Figure 11:
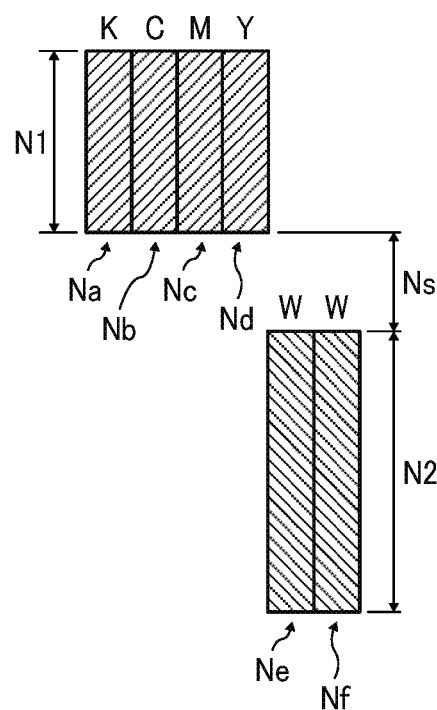
FIG. 11 is a plan view illustrating a head structure according to Embodiment 5.
Figure 12:
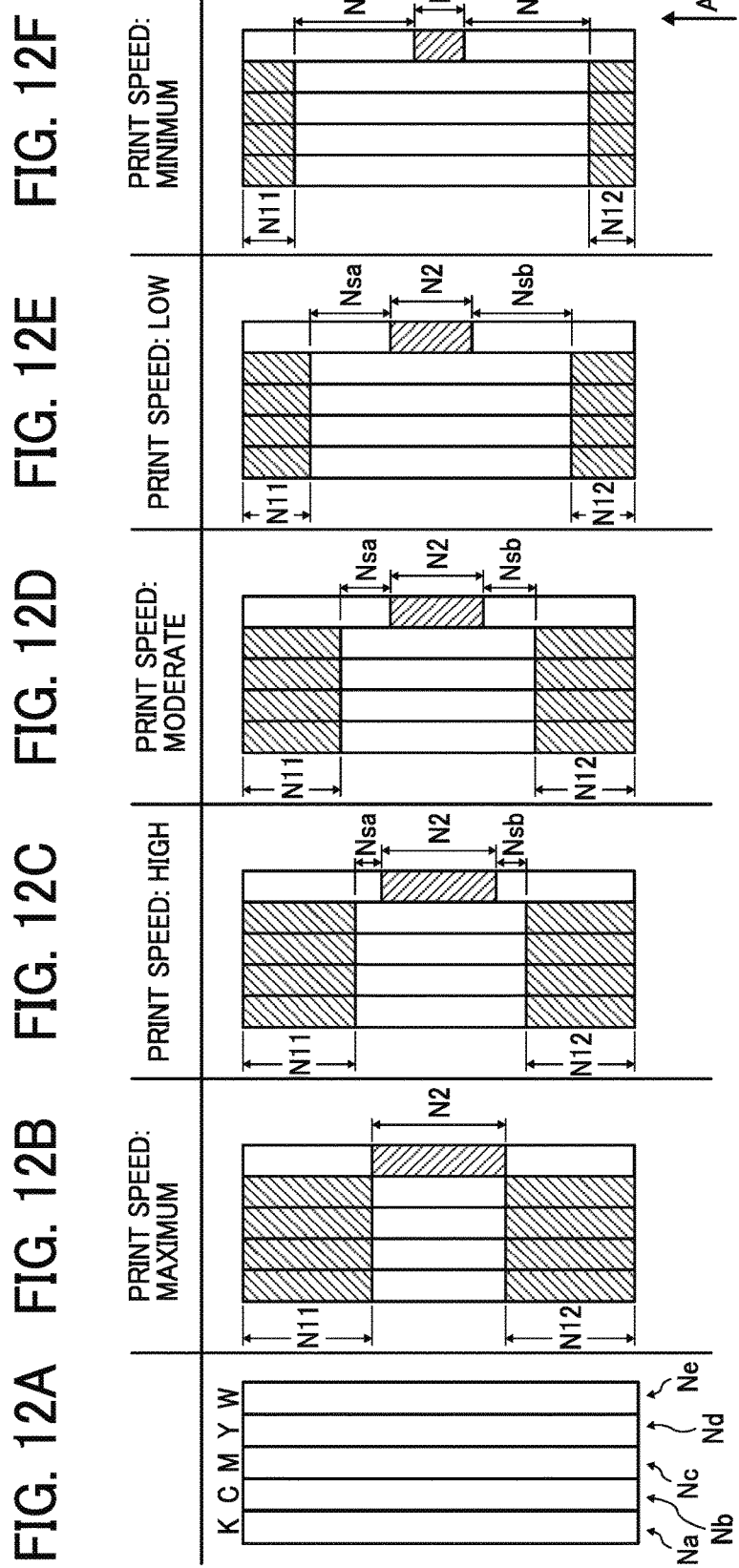
FIGS. 12A through 12F are plan views of a head structure according to Embodiment 6 and illustrate relations between nozzle allocation and print speed in a case where first and second image layers with the first and second liquids is a preceding image and a third image layer with the first liquid is a subsequent image.

Next, Embodiment 5 of the present disclosure is described with reference to FIG. 11. FIG. 11 is a plan view illustrating a head structure according to the present embodiment.

In the head structure illustrated in FIG. 11, in the structure according to Embodiment 4, an interval S is kept in the nozzle array direction between the nozzle lines Na to Nd used as the first nozzle range N1 and the nozzle lines Ne and Nf used as the lines of second nozzle range N2.

With the interval S, a dry range Ns1 can be kept even when all of the nozzles in the nozzle lines Na to Nd are used as the first nozzle range N1 and all of the nozzles in the nozzle lines Ne and Nf are used as the second nozzle range N2.

Next, Embodiment 6 of the present disclosure is described with reference to FIG. 12A to 12F. With reference to FIGS. 12A through 12F, descriptions are given below of a head structure and a relation between nozzle allocation and print speed in a case where first and second image layers are formed with the first and second liquids as preceding images before a third image layer is formed with the first liquid as a subsequent image.

In the present embodiment, nozzles are allocated for forming images in the order of the first image (first image layer), the second image (second image layer), and the first image (third image layer).

The nozzles used to discharge color ink to form the first image as the first image layer are referred to as a first nozzle range N11. The line of nozzles used to discharge white ink to form the second image as the second image layer are referred to as the second nozzle range N2. The line of nozzles used to discharge color ink to form the first image as the third image layer are referred to as a third nozzle range N12. The groups of nozzles not used to discharge color ink or white ink are referred to as disused nozzles. The range of the disused nozzles common to the plurality of nozzle lines provide a dry range Nsa or Nsb. Although the name "third nozzle range N12" is used for discrimination, the third nozzle range N12 can be identified as the first nozzle range, considering that the first liquid is discharged therefrom.

The head 11 according to the present embodiment includes five nozzle lines Na to Ne. The nozzle lines Na to Nd include nozzles used as the first nozzle range N1 and the third nozzle range N12 to discharge color inks (including black ink) serving as the first liquids. The nozzle line Ne includes nozzles used as the second nozzle range N2 to discharge white ink serving as the second liquid.

Regarding the nozzle lines Na to Nd, downstream-side nozzles and upstream-side nozzles in the direction of conveyance of the recording medium indicated by arrow A in FIG. 1 (i.e., the nozzle array direction) are allocated for the first nozzle range N11 and the third nozzle range N12, respectively.

Regarding the nozzle line Ne, a center-side nozzles in the direction of conveyance of the recording medium (i.e., the nozzle array direction) is allocated for the second nozzle range N2.

In the present embodiment, similarly, the print speed decreases as the number of nozzles used as the first nozzle range N11, the second nozzle range N2, the third nozzle range N12 decreases as illustrated in FIGS. 12B to 12F.

In this example, the first and second images formed as the first and second image layers with the first nozzle range N11 and the second nozzle range N2 are preceding images, and the first image formed as the third image layer with the third nozzle range N12 is a subsequent image.

As illustrated in FIGS. 12B to 12F, the number of nozzles used is changed in accordance with the ink amount of the first image as the first image layer and ink amount of the second image as the second image layer to change the print speed.

this case, the number of nozzles in the second nozzle range N2 used to discharge white ink is increased or reduced so that the dry range Nsa between the first nozzle range N11 and the second nozzle range N2 is made similar to the dry range Nsb between the second nozzle range N2 and the third nozzle range N12.

Accordingly, such a manner of changing the print speed is preferably applied when the color ink applied to form the first layer, the white ink applied to form the second layer, and the color ink applied to form the third layer are similar in the amount applied and dry speed.

Next, Embodiment 7 of the present disclosure is described with reference to FIGS. 13A to 13D. With reference to FIGS. 13A through 13D, descriptions are given below of a head structure and a relation between nozzle allocation and print speed in a case where first and second image layers are formed with the first and second liquids as preceding images before a third image layer is formed with the first liquid as the subsequent image.

Figure 13:
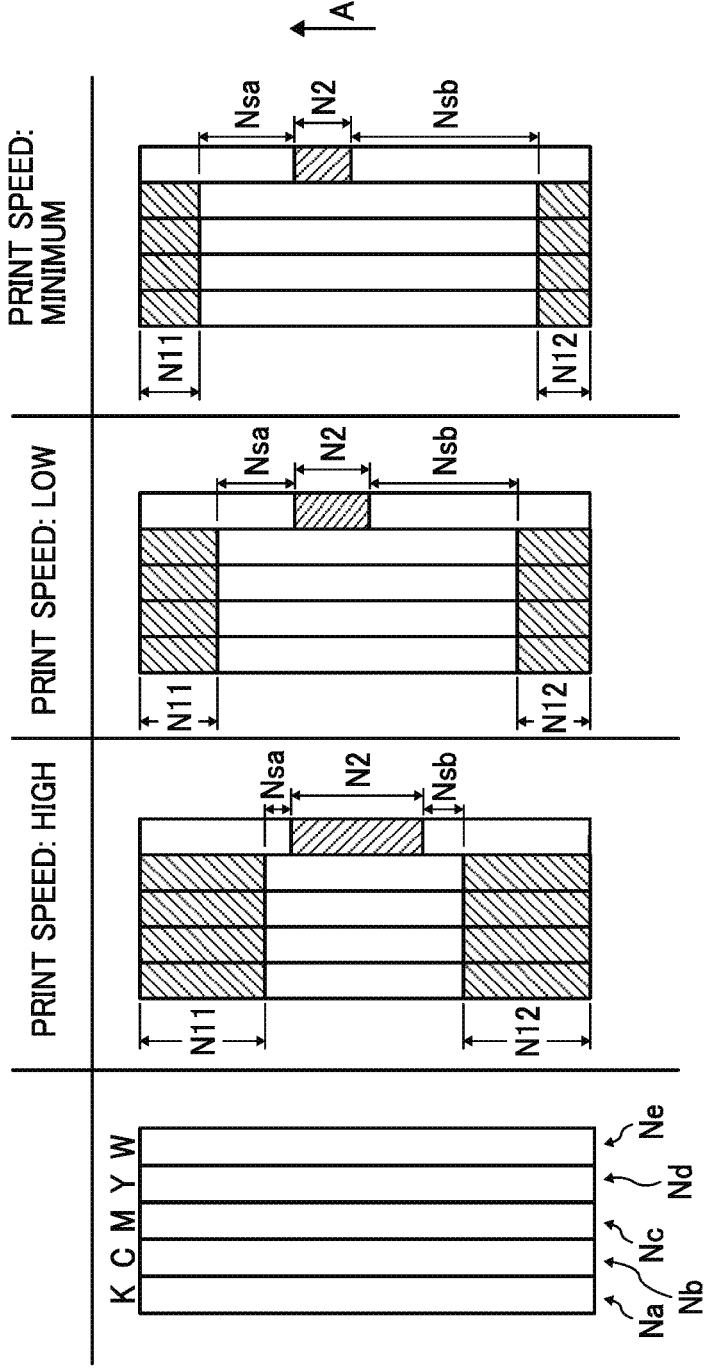
FIGS. 13A through 13D are plan views of a head structure according to Embodiment 7 and illustrate relations between nozzle allocation and print speed in a case where a preceding image includes first and second image layers respectively formed with the first and second liquids and a subsequent image is a third image layer formed with the first liquid.

In the present embodiment, as illustrated in FIGS. 13B to 13D, in order to change the number of nozzles to change the print speed, the downstream end of the second nozzle range N2 for white ink, in the direction of conveyance of recording medium (parallel to the nozzle array direction) indicated by arrow A, is kept unchanged while the upstream end of the second nozzle range N2 is changed to increase or decrease the number of nozzles in the second nozzle range N2. Alternatively, the downstream end of the second nozzle range N2 can be changed with the upstream end kept unchanged. Yet alternatively, the number of nozzles increased or decreased can be different between the downstream side and the upstream side.

Accordingly, in this example, even when the print speed is changed, the dry range Nsa between the first nozzle range N11 and the second nozzle range N2 is not changed. By contrast, the dry range Nsb between the second nozzle range N2 and the third nozzle range N12 increases or decreases corresponding to the change of the print speed.

Such a manner of changing the print speed is preferably applied to a case where the first and third image layers formed with color ink (first liquid) are not solid images and the second image layer formed with white ink (second liquid) is a solid image requiring long drying time.

Next, Embodiment 8 of the present disclosure is described with reference to FIGS. 14A to 14F. With reference to FIGS. 14A through 14F, descriptions are given below of a head structure and a relation between nozzle allocation and print speed in the second mode (image-first mode) where the preceding image is the first image formed with the first liquid and the subsequent image is the second image formed with the second liquid.

Figure 14:
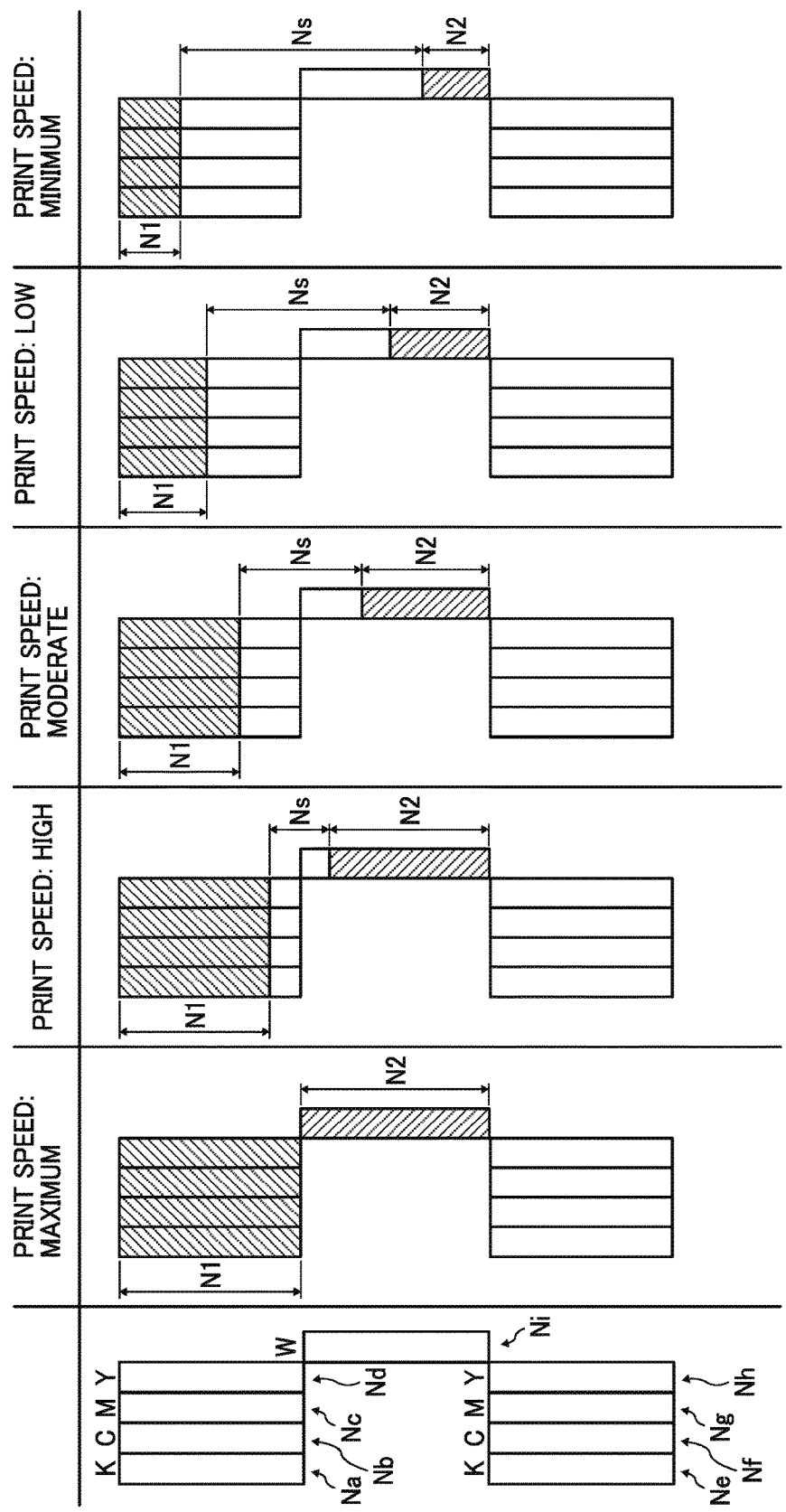
FIGS. 14A through 14F are plan views of a head structure according to Embodiment 8 and illustrate relations between nozzle allocation and print speed in the second mode (image-first mode)
Figure 15:
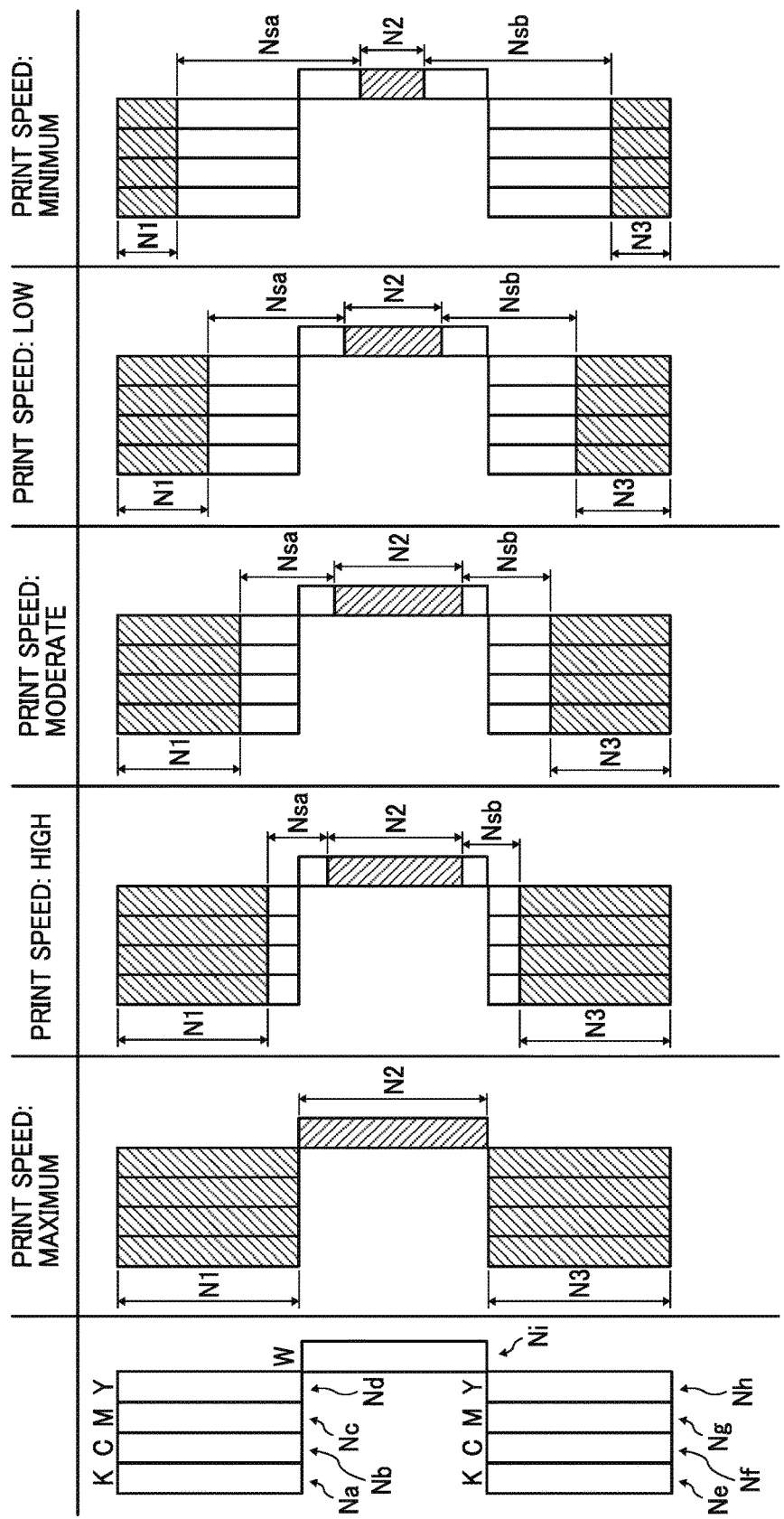
FIGS. 15A through 15F are plan views of a head structure according to Embodiment 9 and illustrate relations between nozzle allocation and print speed in a case where a preceding image includes first and second image layers respectively formed with the first and second liquids and a subsequent image is a third image layer formed with the first liquid.

In the present embodiment, the head 11 includes the nozzle lines Na to Nd, the nozzle lines Ne to Nh, and the nozzle line Ni as illustrated in FIG. 14A.

In the nozzle array direction, the nozzle lines Na to Ni are arranged in the order of the nozzle lines Na to Nd, the nozzle line Ni, and the nozzle lines Ne to Nh.

In the direction perpendicular to the nozzle array direction, the nozzle lines Na to Nd and the nozzle lines Ne to Nh are disposed at an identical position, and the nozzle line Ni is disposed at a position different from the position of the nozzle lines Na to Nd and the nozzle lines Ne to Nh.

The nozzle lines Na to Nd are used as the first nozzle ranges N1 to discharge color ink. The nozzle line Ni is used as the second nozzle range N2 to discharge white ink. The nozzle lines Ne to Nh are used as the third nozzle ranges N12 to discharge color ink.

In other words, in the nozzle array direction, the first nozzle range N1 and the third nozzle range to discharge the first liquid are disposed on both sides (downstream side and upstream side in the medium conveyance direction) of the second nozzle range N2 to discharge the second liquid.

Note that disposing a row of nozzles to discharge another special color ink (e.g., orange, green, or silver ink) parallel to the nozzle line Ni to discharge white ink can attain a wider diversity of printing (wide gamut, metallic color undercoat or overcoat, etc.).

In the present embodiment, as illustrated in FIGS. 14B to 14F, when printing in the second mode (image-first mode) is performed using the nozzle lines Na to Nd and the nozzle line Ni without using the nozzle lines Ne to Nh, the number of nozzles used can be changed in accordance with the ink mount of the first image, to change the print speed.

Similarly, when printing in the first mode (background-first mode) is performed using the nozzle lines Ne to Nh and the nozzle line Ni without using the nozzle lines Na to Nd, the number of nozzles used can be changed in accordance with the ink mount of the second image, to change the print speed.

Next, Embodiment 9 of the present disclosure is described with reference to FIGS. 15A to 15F. With reference to FIGS. 15A through 15F, descriptions are given below of a head structure and a relation between nozzle allocation and print speed in a case where a preceding image includes first and second image layers respectively formed with the first and second liquids and a subsequent image is a third image layer formed with the first liquid (a first image).

For the present embodiment, in the head structure of Embodiment 8, the first image layer is formed with the nozzle lines Na to Nd using color (first image), the second image layer is formed with the nozzle line Ni using white ink (second image), and the third image layer is formed with the nozzle lines Ne to Nh using color ink (first image). Thus, the nozzle lines Na to Nd serve as the first nozzle range N1, the nozzle line Ni serves as the second nozzle range N2, and the nozzle lines Ne to Nh serve as a third nozzle range N3.

In this case, also, as illustrated in FIGS. 15B to 15F, the number of nozzles used is changed in accordance with the ink amount of the first image layer (first image) and the second image layer (second image) to enable change of the print speed.

Note that, in the example illustrated in FIGS. 15B to 15F, the length of drying time of the first image layer (color image) is identical to that of the second image layer (white image). Alternatively, when the first image layer dries faster, the print speed can be changed similar to the above-described manner according to Embodiment 7 (see FIGS. 13B to 13D). That is, the end of the second nozzle range N2 to discharge white ink is shifted to the upstream side or the downstream side in the medium conveyance direction to attain an optimum print sequence. Note that, although images per minute (ipm) or pages per minute (ppm) may be generally used, the unit of print speed used herein is represented by $m^2/h$ as described below. The value of print speed ($m^2/h$) is adjusted by increasing or decreasing the number of nozzles.

Next, descriptions are given below of control procedure to change the print speed, applicable to the above-described embodiments, referring to FIG. 16.

Figure 16:
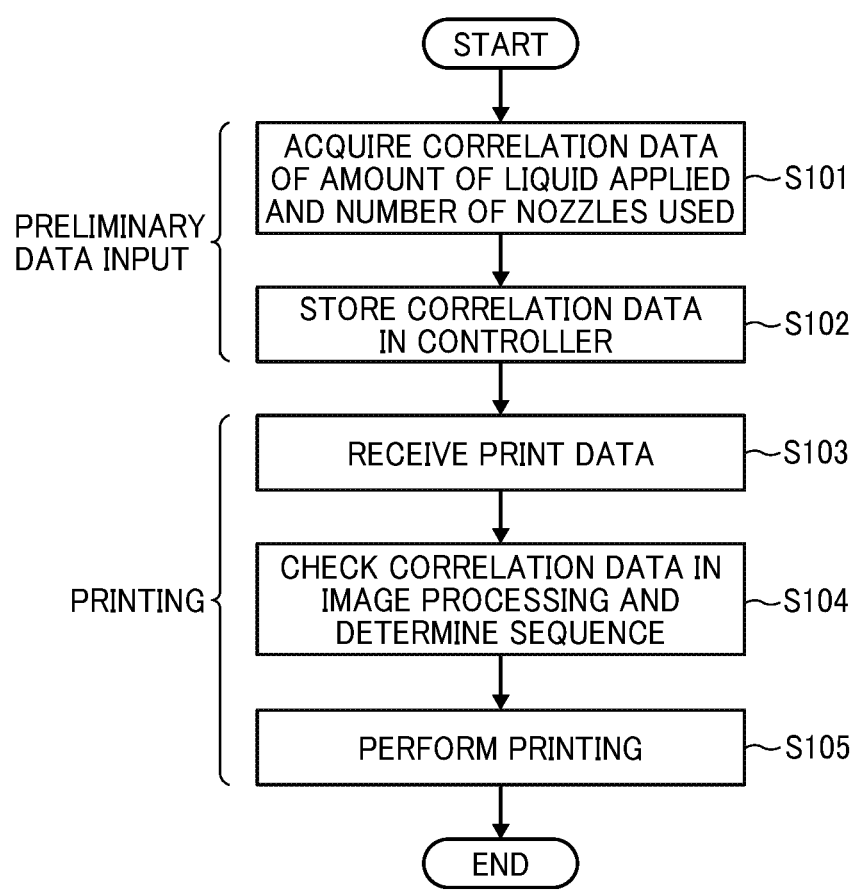
FIG. 16 is a flowchart of control procedure to change the print speed according to an embodiment of the present disclosure.

The flow illustrated in FIG. 16 includes preliminary data input (steps S101 and S102) and print operation (steps S103, S104, and S105). At S101, the controller 500 acquire data of correlation between the amount of liquid applied to form the preceding image and number of nozzles used, through an experiment or a simulation. At S102, the controller 500 stores the correlation data in, for example, the ROM 502. Then, the process of preliminary data input ends.

To perform printing, at S103, the controller 500 receives print data for image processing. In performing image processing, at S104, the controller 500 calculates the amount of liquid applied according to the print data and checks the calculated amount of liquid applied with the correlation data to determine the number of nozzles used. That is, the controller 500 determines the sequence. At S105, the controller 500 causes the printer 100 to perform printing according to the sequence determined at S104.

With this operation, printing can be performed at a highest print speed with image failure inhibited in accordance with the amount of liquid applied to form the preceding image (i.e., liquid adhesion amount in the preceding image). Thus, print speed and print quality improve.

The above-described embodiment is described with the example in which the second liquid is a liquid for background. Note that the second liquid is not limited to the liquid for background and may be, for example, a pre-coating liquid (treatment liquid) for reducing image bleeding or enhancing the adhesion of liquid to a medium, clear ink to be formed on an image to protect the image, or a post-coating liquid (treatment liquid) for enhancing the fixing performance. In some embodiments, data of correlation (correlation data) between the amount of liquid applied to form the preceding image and the number of nozzles may be acquired for the types (e.g., the first liquid or the second liquid) of liquid used to form the preceding image and stored and held in, e.g., the ROM 502, the RAM 503, or the NVRAM 504.

(Ink)

There is no specific limitation on the ink used for the printer according to an embodiment of the present invention. In particular, a white ink including an organic solvent accounting for 15% to 35% by mass of the white ink is preferably used in the first mode (background-first, white undercoat, or front printing mode) in which the background image with white ink (the second image) is printed before the main image (the first image) is printed with the color ink, since formation of abnormal image is suppressed and printing speed is increased due to excellent drying property of the white ink.

According to the preferred embodiments described below, drying property of the ink is further improved and the printing speed is further increased.

Preferably, the white ink includes resin particles accounting for 2% to 10% by mass of the white ink.

Preferably, the white ink includes a compound represented by the following formula (1):

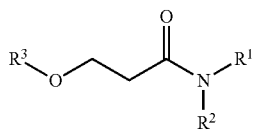

Formula (1)

where each of $R^1$, $R^2$, and $R^3$ independently represents an alkyl group having 1 to 5 carbon atoms.

Preferably, the compound represented by the formula (1) accounts for 3% to 12% by mass of the white ink.

<Organic Solvent>

Examples of the organic solvent include, but are not limited to, water-soluble organic solvents.

Specific examples of the water-soluble organic solvents include, but are not limited to, polyols such as ethylene glycol, diethylene glycol, 1,2-propanediol, 1,3-propanediol, 1,2-butanediol, 1,3-butanediol, 2,3-butanediol, 3-methyl-1,3-butanediol, 2-methyl-2,4-pentanediol, triethylene glycol, polyethylene glycol, polypropylene glycol, 1,5-pentanediol, 1,6-hexanediol, glycerin, 1,2,6-hexanetriol, 2-ethyl-1,3-hexanediol, 1,2,4-butanetriol, 1,2,3-butanetriol, and 3-methyl-1,3,5-pentanetriol; polyol alkyl ethers such as ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, dipropylene glycol monomethyl ether and propylene glycol monoethyl ether; polyol aryl ethers such as ethylene glycol monophenyl ether and ethylene glycol monobenzyl ether; nitrogen-containing heterocyclic compounds such as 2-pyrrolidone, N-methyl-2-pyrrolidone, N-hydroxyethyl-2-pyrrolidone, 1,3-dimethyl imidazolidinone, ε-caprolactam, and γ-butyrolactone; amides such as formamide, N-methylformamide, and N,N-dimethylformamide; amines such as monoethanolamine, diethanolamine, and triethylamine; sulfur-containing compounds such as dimethyl sulfoxide, sulfolane, and thiodiethanol; propylene carbonate; and ethylene carbonate. Each of these compounds can be used alone or in combination with others.

Among these compounds, 1,2-propanediol, 1,3-propanediol, 1,2-butanediol, 1,3-butanediol, 2,3-butanediol, 2-methyl-2,4-pentanediol, and dipropylene glycol monomethyl ether are preferable for increasing glossiness and preventing aggregation of particles. In addition, 1,2-propanediol and 1,2-butanediol, each having a boiling point of less than 200° C., are preferable for enhancing rub resistance and solvent resistance and accelerating formation of a resin film.

Preferably, the organic solvent accounts for 10% to 70% by mass, more preferably from 15% to 35% by mass, of the ink, for improving drying property and discharge stability. When the organic solvent accounts for 35% by mass or less of the ink, water content of the ink can be increased correspondingly, leading to improvement of drying property and increase of printing speed. When the organic solvent accounts for 15% by mass or more of the ink, dispersibility with other components is enhanced. In addition, moisture retaining property of the surface of a nozzle plate is maintained, and therefore it is unlikely that a film is formed at meniscus, leading to excellent ink jetting property.

The ink may include a compound represented by the formula (1) as the organic solvent.

<Compound Represented by Formula (1)>

The compound represented by the formula (1) is capable of accelerating formation of a resin film in the process of drying of the ink, leading to enhancement of drying property of the ink.

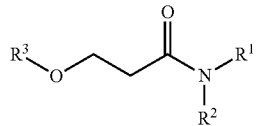

Formula (1)

where each of $R^1$, $R^2$, and $R^3$ independently represents an alkyl group having 1 to 5 carbon atoms.

Specific examples of the alkyl group having 1 to 5 carbon atoms include, but are not limited to, methyl group, ethyl group, propyl group, isopropyl group, butyl group, and pentyl group.

Specific examples of the compound represented by the formula (1) include, but are not limited to, 3-methoxy-N,N-dimethylpropionamide represented by the following formula (1-1); 3-butoxy-N,N-dimethylpropionamide represented by the following formula (1-2); and 3-methoxy-N,N-diethylpropionamide. Each of these compounds can be used alone or in combination with others. Among these compounds, 3-methoxy-N,N-dimethylpropionamide represented by the following formula (1-1) is preferable for adhesiveness, rub resistance, non-transferability, and high glossiness.

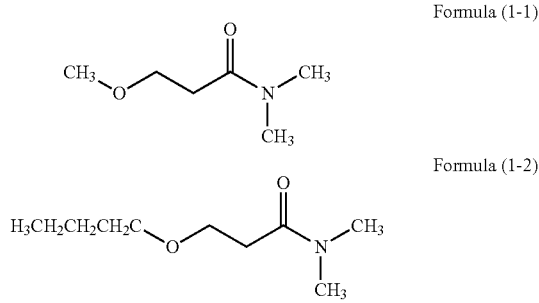

Formula (1-1)

Formula (1-2)

When the ink includes the compound represented by the formula (1), compatibility of the organic solvent with the resin particles is enhanced, thereby improving dispersibility of the resin particles. In addition, since the compound represented by the formula (1) has high permeability to various non-permeating media, the ink can secure satisfactory wettability to non-permeating media. As a result, an image with excellent ink drying property can be obtained.

Specific examples of commercially-available products of the compound represented by the formula (1) include, but are not limited to, KJCMPA-100 (product of KJ Chemicals Corporation, 3-methoxy-N,N-dimethylpropionamide represented by the formula (1) where $R^1$ is methyl group, $R^2$ is methyl group, and $R^3$ is methyl group) and EQUAMIDE B100 (product of Idemitsu Kosan Co., Ltd., 3-butoxy-N,N-dimethylpropionamide represented by the formula (1) where $R^1$ is methyl group, $R^2$ is methyl group, and $R^3$ is butyl group). Each of these compounds can be used alone or in combination with others.

Preferably, the compound represented by the formula (1) accounts for 1% to 50% by mass, more preferably 3% to 40% by mass, and most preferably 3% to 12% by mass, of the ink. When the compound represented by the formula (1) accounts for 3% by mass or more of the ink, a film is more easily formed so that drying property is improved. As a result, printing speed is increased. When the compound represented by the formula (1) accounts for 12% by mass or less of the ink, it is unlikely that a film is formed at meniscus, leading to excellent ink jetting property.

When the compound represented by the formula (1) is used in combination with an organic solvent that has affinity for the resin particles and has a relatively-low boiling point (such as 1,2-propanediol, 1,3-propanediol, 1,2-butanediol, 1,3-butanediol, and 2,3-butanediol), dispersion stability of the resin particles in the ink can be secured and homogeneity of solid portions in the resulting image can be improved, providing excellent image quality.

<Resin Particles>

Specific examples of the resin particles include, but are not limited to: polyester resin particles; polyurethane resin particles; epoxy resin particles; polyamide resin particles; polyether resin particles; acrylic resin particles; acrylic-silicone resin particles; condensation-based synthetic resin particles such as fluorine-based resin particles; addition-based synthetic resin particles such as polyolefin resin particles, polystyrene resin particles, polyvinyl alcohol resin particles, polyvinyl ester resin particles, polyacrylic acid resin particles, and unsaturated carboxylic acid resin particles; and natural polymers such as celluloses, rosins, and natural rubbers. Each of these resin particles can be used alone or in combination with others.

Among the above-exemplified resin particles, preferably, the ink includes at least polyurethane resin particles for dispersion stability of the ink and high glossiness. In this case, film formation property is enhanced and drying property is thereby improved, leading to effective suppression of color bleeding.

These resin particles are available either synthetically or commercially.

<<Polyurethane Resin Particles>>

Specific examples of the polyurethane resin particles include, but are not limited to, those obtained by a reaction of a polyol with a polyisocyanate.

Specific examples of the polyol include, but are not limited to, polyether polyol, polycarbonate polyol, and polyester polyol. Each of these compounds can be used alone or in combination with others.

—Polyether Polyol—

Specific examples of the polyether polyol include, but are not limited to, those obtained by an addition polymerization of at least one type of compound having 2 or more active hydrogen atoms, as a starting material, with an alkylene oxide.

Specific examples of the starting material include, but are not limited to, ethylene glycol, diethylene glycol, triethylene glycol, propylene glycol, trimethylene glycol, 1,3-butanediol, 1,4-butanediol, 1,6-hexanediol, glycerin, trimethylolethane, and trimethylolpropane. Each of these compounds can be used alone or in combination with others.

Specific examples of the alkylene oxide include, but are not limited to, ethylene oxide, propylene oxide, butylene oxide, styrene oxide, epichlorohydrin, and tetrahydrofuran. Each of these compounds can be used alone or in combination with others.

Specific preferred examples of the polyether polyol include, but are not limited to, polyoxytetramethylene glycol and polyoxypropylene glycol, for obtaining an ink binder that is capable of imparting excellent rub resistance to the ink. Each of these compounds can be used alone or in combination with others.

—Polycarbonate Polyol—

Specific examples of the polycarbonate polyol for preparing the polyurethane resin particles include, but are not limited to, those obtained by a reaction of a carbonate ester with a polyol or a reaction of phosgene with bisphenol A. Each of these compounds can be used alone or in combination with others.

Specific examples of the carbonate ester include, but are not limited to, methyl carbonate, dimethyl carbonate, ethyl carbonate, diethyl carbonate, cyclocarbonate, and diphenyl carbonate. Each of these compounds can be used alone or in combination with others.

Specific examples of the polyol include, but are not limited to: relatively-low-molecular-weight dihydroxy compounds such as ethylene glycol, diethylene glycol, triethylene glycol, 1,2-propylene glycol, 1,3-propylene glycol, dipropylene glycol, 1,4-butanediol, 1,3-butanediol, 1,2-butanediol, 2,3-butanediol, 1,5-pentanediol, 1,5-hexanediol, 2,5-hexanediol, 1,6-hexanediol, 1,7-heptanediol, 1,8-octanediol, 1,9-nonanediol, 1,10-decanediol, 1,11-undecanediol, 1,12-dodecanediol, 1,4-cyclohexanediol, 1,4-cyclohexanedimethanol, hydroquinone, resorcinol, bisphenol A, bisphenol F, and 4,4'-biphenol; polyether polyols such as polyethylene glycol, polypropylene glycol, and polyoxytetramethylene glycol; and polyester polyols such as polyhexamethylene adipate, polyhexamethylene succinate, and polycaprolactone. Each of these compounds can be used alone or in combination with others.

—Polyester Polyol—

Specific examples of the polyester polyol include, but are not limited to: those obtained by an esterification reaction of a low-molecular-weight polyol with a polycarboxylic acid; polyesters obtained by a ring-opening polymerization reaction of a cyclic ester compound such as ε-caprolactone; and copolymer polyesters thereof Each of these compounds can be used alone or in combination with others.

Specific examples of the low-molecular-weight polyol include, but are not limited to, ethylene glycol and propylene glycol. Each of these compounds can be used alone or in combination with others.

Specific examples of the polycarboxylic acid include, but are not limited to, succinic acid, adipic acid, sebacic acid, dodecanedicarboxylic acid, terephthalic acid, isophthalic acid, phthalic acid, and anhydrides and ester-forming derivatives thereof Each of these compounds can be used alone or in combination with others.

—Polyisocyanate—

Specific examples of the polyisocyanate include, but are not limited to: aromatic diisocyanates such as phenylene diisocyanate, tolylene diisocyanate, diphenylmethane diisocyanate, and naphthalene diisocyanate; and aliphatic or alicyclic diisocyanates such as hexamethylene diisocyanate, lysine diisocyanate, cyclohexane diisocyanate, isophorone diisocyanate, dicyclohexylmethane diisocyanate, xylylene diisocyanate, tetramethylxylylene diisocyanate, and 2,2,4-trimethylhexamethylene diisocyanate. Each of these compounds can be used alone or in combination with others. Among these compounds, aliphatic or alicyclic diisocyanates are preferable for their long-term fade resistance, especially when the ink is used for poster or sign displayed outdoor that requires the ink film maintain very high fade resistance for an extended period of time.

Furthermore, when at least one type of alicyclic diisocyanate is used, the resulting image is provided with high film strength and rub resistance.

Specific examples of the alicyclic diisocyanate include, but are not limited to, isophorone diisocyanate and dicyclohexylmethane diisocyanate.

Preferably, the alicyclic diisocyanate accounts for 60% by mass or more of the total isocyanate compounds.

<<Method for Producing Polyurethane Resin Particles>>

The polyurethane resin particles may be produced by a known method as follows.

First, the polyol and the polyisocyanate, in an equivalent ratio that isocyanate group becomes excessive, are allowed to react in the presence or absence of an organic solvent, to prepare an isocyanate-terminated urethane prepolymer.

Next, anionic groups in the isocyanate-terminated urethane prepolymer are neutralized with a neutralizer, if necessary. The isocyanate-terminated urethane prepolymer is thereafter allowed to react with a chain extender, followed by removal of the organic solvent from the reaction system, if necessary.

Specific examples of the organic solvent used in producing the polyurethane resin particles include, but are not limited to: ketones such as acetone and methyl ethyl ketone; ethers such as tetrahydrofuran and dioxane; acetates such as ethyl acetate and butyl acetate; nitriles such as acetonitrile; and amides such as dimethylformamide, N-methylpyrrolidone, and N-ethylpyrrolidone. Each of these compounds can be used alone or in combination with others.

Specific examples of the chain extender include, but are not limited to, polyamines and other compounds having an active hydrogen group. Each of these compounds can be used alone or in combination with others.

Specific examples of the polyamines include, but are not limited to: diamines such as ethylenediamine, 1,2-propanediamine, 1,6-hexamethylenediamine, piperazine, 2,5-dimethylpiperazine, isophoronediamine, 4,4'-dicyclohexylmethanediamine, and 1,4-cyclohexanediamine; polyamines such as diethylenetriamine, dipropylenetriamine, and triethylenetetramine; hydrazines such as hydrazine, N,N'-dimethylhydrazine, and 1,6-hexamethylenebishydrazine; and dihydrazides such as succinic acid dihydrazide, adipic acid dihydrazide, glutaric acid dihydrazide, sebacic acid dihydrazide, and isophthalic acid dihydrazide. Each of these compounds can be used alone or in combination with others.

Specific examples of the other compounds having an active hydrogen group include, but are not limited to: glycols such as ethylene glycol, diethylene glycol, triethylene glycol, propylene glycol, 1,3-propanediol, 1,3-butanediol, 1,4-butanediol, hexamethylene glycol, sucrose, methylene glycol, glycerin, and sorbitol; and phenols such as bisphenol A, 4,4'-dihydroxydiphenyl, 4,4'-dihydroxydiphenyl ether, 4,4'-dihydroxydiphenyl sulfone, hydrogenated bisphenol A, and hydroquinone. Each of these compounds can be used alone or in combination with others so long as storage stability of the ink does not deteriorate.

Specific preferred examples of the polyurethane resin particles include polycarbonate-based urethane resin particles for high glossiness. When polycarbonate-based urethane resin particles are used, the ink can provide recorded matter that maintains high glossiness even when used in a severe environment such as outdoor environment.

Specific examples of commercially-available products of the polyurethane resin particles include, but are not limited to, UCOAT UX-485 (polycarbonate-based urethane resin particles), UCOAT UWS-145 (polyester-based urethane resin particles), PERMARIN UA-368T (polycarbonate-based urethane resin particles), and PERMARIN UA-200 (polyether-based urethane resin particles), all products available from Sanyo Chemical Industries, Ltd. Each of these compounds can be used alone or in combination with others.

Preferably, the resin particles have a volume average particle diameter of from 10 to 1,000 nm, more preferably from 10 to 200 nm, and most preferably from 10 to 100 nm, considering a case in which the ink is used for an inkjet printer.

A combined use of the ink including resin particles having a volume average particle diameter of from 10 to 1,000 nm with an ink discharge device having a circulator for circulating the ink provides excellent ink supply property and discharge stability. In addition, because the resin particles are easily dissolved in an organic solvent, the resin is effectively extended over a print medium when the ink is being dried on the print medium, providing an image with high gloss.

The volume average particle diameter can be measured with, for example, a particle size analyzer (MICROTRAC MODEL UPA9340 available from Nikkiso Co., Ltd.).

In a case in which the ink includes resin particles, the resin particles preferably account for 1% to 15% by mass, more preferably 5% to 12% by mass, and most preferably 2% to 10% by mass, of the ink.

When the resin particles account for 2% by mass or more of the ink, it is unlikely that a film is formed at meniscus, leading to excellent discharge property. When the resin particles account for 10% by mass or less of the ink, film formation property is improved, leading to improvement of discharge property and increasing of printing speed.

<Water>

The printer in accordance with some embodiments of the present invention may use either a solvent ink containing no water or a water-based ink containing water. The water-based ink provides a high level of safety and does not affect the environment. Examples of water usable for the water-based ink include, but are not limited to: pure water such as ion-exchange water, ultrafiltration water, reverse osmosis water, and distilled water; and ultrapure water. Each of these types of waters can be used alone or in combination with others.

Preferably, the water accounts for 15% to 60% by mass of the ink. When the water accounts for 15% by mass or more of the ink, the ink is prevented from increasing viscosity and discharge stability is improved. When the water accounts for 60% by mass or less, wettability of the ink to non-permeating substrates are good and image quality is improved.

<Colorant>

White Ink

As a standard for whiteness of white inks, ISO-2469 (JIS-8148) is known. Generally, materials having a whiteness value of 70 or more can be used as white colorants.

Specific examples of colorants usable for the white ink include, but are not limited to, titanium oxide, iron oxide, tin oxide, zirconium oxide, iron titanate (i.e., complex oxide of iron and titanium), resin hollow particles, and inorganic hallow particles.

Process Color Ink and Special Color Ink (Non-white Ink)

Examples of process color ink and special color ink include non-white inks such as color ink, black ink, gray ink, clear ink, and metallic ink.

Here, the clear ink refers to an ink including no colorant but including resin particles, an organic solvent, and water as major components.

Examples of the color ink include, but are not limited to, cyan ink, magenta ink, yellow ink, light cyan ink, light magenta ink, red ink, green ink, blue ink, orange ink, and violet ink.

Specific examples of colorants usable for the non-white inks include, but are not limited to, dyes and pigments exhibiting non-white color. Each of these colorants can be used alone or in combination with others. In particular, pigments are preferable.

Examples of the pigments include inorganic pigments and organic pigments.

Specific examples of the inorganic pigments include, but are not limited to, barium yellow, cadmium red, chrome yellow, and carbon blacks produced by known methods, such as contact method, furnace method, and thermal method. Each of these pigments can be used alone or in combination with others.

Specific examples of the organic pigments include, but are not limited to, azo pigments (e.g., azo lakes, insoluble azo pigments, condensed azo pigments, and chelate azo pigments), polycyclic pigments (e.g., phthalocyanine pigments, perylene pigments, perinone pigments, anthraquinone pigments, quinacridone pigments, dioxazine pigments, indigo pigments, thioindigo pigments, isoindolinone pigments, and quinophthalone pigments), dye chelates (e.g., basic dye chelates and acid dye chelates), nitro pigments, nitroso pigments, and aniline black. Each of these pigments can be used alone or in combination with others.

Among these pigments, those having good affinity for solvents are preferable.

Specific examples pigments usable for the black ink include, but are not limited to: carbon blacks (i.e., C.I. Pigment Black 7) such as furnace black, lamp black, acetylene black, and channel black; metals such as copper and iron (i.e., C.I. Pigment Black 11); and organic pigments such as aniline black (i.e., C.I. Pigment Black 1). Each of these pigments can be used alone or in combination with others.

Specific examples of pigments usable for the color inks include, but are not limited to: C.I. Pigment Yellow 1, 3, 12, 13, 14, 17, 24, 34, 35, 37, 42 (yellow iron oxide), 53, 55, 74, 81, 83, 95, 97, 98, 100, 101, 104, 108, 109, 110, 117, 120, 138, 150, 153, and 155; C.I. Pigment Orange 5, 13, 16, 17, 36, 43, and 51; C.I. Pigment Red 1, 2, 3, 5, 17, 22, 23, 31, 38, 48:2 (Permanent Red 2B(Ca)), 48:3, 48:4, 49:1, 52:2, 53:1, 57:1 (Brilliant Carmine 6B), 60:1, 63:1, 63:2, 64:1, 81, 83, 88, 101 (red iron oxide), 104, 105, 106, 108 (cadmium red), 112, 114, 122 (quinacridone magenta), 123, 146, 149, 166, 168, 170, 172, 177, 178, 179, 185, 190, 193, 209, and 219; C.I. Pigment Violet 1 (rhodamine lake), 3, 5:1, 16, 19, 23, and 38; C.I. Pigment Blue 1, 2, 15 (phthalocyanine blue), 15:1, 15:2, 15:3 (phthalocyanine blue), 16, 17:1, 56, 60, and 63; and C.I. Pigment Green 1, 4, 7, 8, 10, 17, 18, and 36. Each of these pigments can be used alone or in combination with others.

Specific examples of the dyes include, but are not limited to: C.I. Acid Yellow 17, 23, 42, 44, 79, and 142; C.I. Acid Red 52, 80, 82, 249, 254, and 289; C.I. Acid Blue 9, 45, and 249; C.I. Acid Black 1, 2, 24, and 94; C. I. Food Black 1 and 2; C.I. Direct Yellow 1, 12, 24, 33, 50, 55, 58, 86, 132, 142, 144, and 173; C.I. Direct Red 1, 4, 9, 80, 81, 225, and 227; C.I. Direct Blue 1, 2, 15, 71, 86, 87, 98, 165, 199, and 202; C.I. Direct Black 19, 38, 51, 71, 154, 168, 171, and 195; C.I. Reactive Red 14, 32, 55, 79, and 249; and C.I. Reactive Black 3, 4, and 35. Each of these dyes can be used alone or in combination with others.

Examples of colorants usable for the metallic ink include, but are not limited to, fine powders obtained by finely grinding a single body of metal, metal alloy, or metal compound. More specifically, such fine powders may be obtained by finely grinding at least one material selected from metals (e.g., aluminum, silver, gold, nickel, chromium, tin, zinc, indium, titanium, silicon, copper, and platinum), alloys of such metals, and oxides, nitrides, sulfides, and carbides of such metals and metal alloys.

In addition, self-dispersing pigments capable of being dispersed in water may be used, such as pigments (e.g., carbon black) to which a functional group (e.g., sulfonic group and carboxyl group) is introduced.

Furthermore, microcapsules incorporating pigment particles, i.e., resin particles incorporating pigment particles, capable pf being dispersed in water may also be used.

In this case, not all the pigment particles included in the ink need not necessarily be contained in or adsorbed to the resin particles, and a part of the pigment particles may be dispersed in the ink, so long as the effect thereof is not lost.

Preferably, the number average particle diameter of the pigment particles is 20 to 150 nm, when determined based on the greatest frequency converted from the greatest number. When the number average particle diameter is 20 nm or more, dispersion operation and classification operation become easier. When the number average particle diameter is 150 nm or less, not only pigment dispersion stability in the ink composition is improved, but also discharge stability and image quality (e.g., image density) are enhanced.

The number average particle diameter can be measured with, for example, a particle size analyzer (MICROTRAC MODEL UPA9340 available from Nikkiso Co., Ltd.).

The pigment may be dispersed using a dispersant such as a polymeric dispersant and a water-soluble surfactant. Each of these compounds can be used alone or in combination with others.

<<Surfactant>>

The ink may include a surfactant for securing wettability to print media.

Examples of the surfactant include, but are not limited to, ampholytic surfactants, nonionic surfactants, and anionic surfactants. Each of these surfactants can be used alone or in combination with others. Among these, nonionic surfactants are preferable for dispersion stability and image quality.

In addition, a fluorine-based surfactant and a silicone-based surfactants may be used in combination or alone, depending on the ink composition.

<Preservative and Fungicide>

Specific examples of usable preservative and fungicide include, but are not limited to, 1,2-benzisothiazoline-3-one.

<pH Adjuster>

Specific examples of usable pH adjusters include, but are not limited to, materials capable of adjusting pH to 7 or higher, such as amines (e.g., diethanolamine and triethanolamine).

<Method for Producing Ink>

The ink may be produced by dispersing or dissolving water, an organic solvent, the compound represented by the formula (1), resin particles, and optional components in an aqueous medium, followed by stir-mixing. The stir-mixing may be performed by a sand mill, homogenizer, ball mill, paint shaker, ultrasonic disperser, stirrer equipped with stirring blades, magnetic stirrer, or high-speed disperser.

<Viscosity>

Preferably, the ink has a viscosity of 2 mPa·s or more, more preferably from 3 to 20 mPa·s, at 25° C., for improving image quality including the quality of texts recorded on a print medium.

When the viscosity is 2 mPa·s or more, discharge stability is improved.

(Ink Cartridge)

Examples of an ink cartridge of the present disclosure include those containing process color ink, special color ink, or white ink in a container.

The ink cartridge contains a container, the ink contained in the container, and optionally other members as necessary.

The container is not limited in shape, structure, size, and material. Examples of the container include, but are not limited to, an ink bag which is formed of an aluminum laminate film or a resin film.

<Recorded Matter>

Recorded matter includes a recording medium and an image recorded with the above ink on the recording medium.

<Recording Medium>

The recording medium is not particularly limited. For example, plain paper, glossy paper, special paper, and cloth are usable. It is also possible to form good quality images on non-permeating media.

The non-permeating media refer to substrates having a surface with low moisture permeability and absorptivity. Examples of such substrates include a material having a number of hollow spaces inside but not open to the exterior. To be more quantitative, the non-permeating media refer to substrates that absorb water in an amount of 10 mL/m$^2$ or less from the start of contact to 30 msec$^{1/2}$ thereafter, when measured according to the Bristow method.

Specific preferred examples of the non-permeating media include, but are not limited to, plastic films such as vinyl chloride resin film, polyethylene terephthalate (PET) film, polypropylene film, polyethylene film, and polycarbonate film. The recording medium is not limited to articles used as typical recording media. Examples of articles usable as the recording medium include: building materials such as wall paper, floor material, and tile; cloth for apparel such as T-shirt; textile; and leather. In addition, by adjusting the configuration of conveyance paths for the recording medium, ceramics, glass, and metals may be used as the recording medium.

EXAMPLES

Further understanding can be obtained by reference to certain specific examples which are provided herein for the purpose of illustration only and are not intended to be limiting.

Preparation Example 1 of Polycarbonate-based Urethane Resin Emulsion

In a reaction vessel in which a stirrer, a reflux condenser, and a thermometer were inserted, 1,500 g of a polycarbonate diol (reaction product of 1,6-hexanediol with dimethyl carbonate, having a number average molecular weight (Mn) of 1,200), 220 g of 2,2-dimethylol propionic acid ("DMPA"), and 1,347 g of N-methylpyrrolidone ("NMP") were contained under nitrogen gas flow and heated to 60° C. so that DMPA was dissolved.

Further, 1,445 g of 4,4'-dicyclohexylmethane diisocyanate and 2.6 g of dibutyltin dilaurate (serving as a catalyst) were added to the vessel and heated to 90° C., and an urethane-forming reaction was performed for 5 hours. Thus, an isocyanate-terminated urethane prepolymer was prepared. The reaction mixture was cooled to 80° C. and further mixed with 149 g of triethylamine. Thereafter, 4,340 g of the resulting mixture was added to a mixture liquid of 5,400 g of water and 15 g of triethylamine under strong stirring. Next, 1,500 g of ice was poured into the vessel, and 626 g of a 35% by mass aqueous solution of 2-methyl-1,5-pentanediamine was further added thereto to cause a chain extension reaction. The solvent was distilled so that the solid content became 30%. Thus, a polycarbonate-based urethane resin emulsion was prepared.

The lowest film-forming temperature of the polycarbonate-based urethane resin emulsion measured by a film-forming temperature tester (available from IMOTO MACHINERY CO., LTD.) was 55° C.

Preparation Example 2 of Polyether-based Urethane Resin Emulsion

After replacing the air in a vessel equipped with a thermometer, a nitrogen gas inlet tube, and a stirrer with nitrogen gas, 100.2 parts by mass of a polyether polyol (PTMG1000 available from Mitsubishi Chemical Corporation, having an average molecular weight of 1,000), 15.7 parts by mass of 2,2-dimethylol propionic acid, 48.0 parts by mass of isophorone diisocyanate, and 77.1 parts by mass of methyl ethyl ketone (as an organic solvent) were reacted in the vessel in the presence of 0.06 parts by mass of dibutyltin dilaurate ("DMTDL") as a catalyst.

The reaction was continued for 4 hours and 30.7 parts by mass of methyl ethyl ketone (as a diluting solvent) was thereafter added to further continue the reaction.

At the time when the average molecular weight of the reaction product reached the range of from 20,000 to 60,000, 1.4 parts by mass of methanol was added to terminate the reaction. Thus, an organic solvent solution of urethane resin was obtained.

Next, 13.4 parts by mass of a 48% by mass aqueous solution of potassium hydroxide was added to the organic solvent solution of urethane resin to neutralize carboxyl groups in the urethane resin. Further, 715.3 parts by mass of water was added thereto and sufficiently stirred, followed by aging and solvent removal. Thus, a polyether-based urethane resin emulsion having a solid content of 30% by mass was prepared.

The lowest film-forming temperature of the polyether-based urethane resin emulsion, measured by a film-forming temperature tester (available from IMOTO MACHINERY CO., LTD.) in the same manner as in Preparation Example 1 of Polycarbonate-based Urethane Resin Emulsion, was 43° C.

Preparation Example 3 of Polyester-based Urethane Resin Emulsion

The procedure for preparing the polyether-based urethane resin emulsion in Preparation Example 2 was repeated except for replacing the polyether polyol (PTMG1000 available from Mitsubishi Chemical Corporation, having an average molecular weight of 1,000) with a polyester polyol (POLYLITE OD-X-2251 available from DIC Corporation, having an average molecular weight of 2,000). Thus, a polyester-based urethane resin emulsion having a solid content of 30% by mass was prepared.

The lowest film-forming temperature of the polyester-based urethane resin emulsion, measured by a film-forming temperature tester (available from IMOTO MACHINERY CO., LTD.) in the same manner as in Preparation Example 1 of Polycarbonate-based Urethane Resin Emulsion, was 74° C.

<Preparation of Pigment Dispersion Liquids> <<Preparation of Black Pigment Dispersion Liquid>>

The below-listed materials were premixed. The resulting mixture was subject to a circulation dispersion treatment using a disk type bead mill (KDL type available from Shinmaru Enterprises Corporation, filled with zirconia ball media having a diameter of 0.3 mm) for 7 hours. Thus, a black pigment dispersion liquid (having a pigment solid content concentration of 15% by mass) was prepared.

Carbon black pigment (MONARCH 800 available from Cabot Corporation): 15 parts by mass Anionic surfactant (PIONINE A-51-B available from Takemoto Oil & Fat Co., Ltd.): 2 parts by mass Ion-exchange water: 83 parts by mass <<Preparation of Cyan Pigment Dispersion Liquid>>

The procedure for preparing the black pigment dispersion liquid was repeated except for replacing the carbon black pigment with Pigment Blue 15:3 (LIONOL BLUE FG-7351 available from Toyo Ink Co., Ltd.). Thus, a cyan pigment dispersion liquid (having a solid pigment concentration of 15% by mass) was prepared.

<<Preparation of Magenta Pigment Dispersion Liquid>>

The procedure for preparing the black pigment dispersion liquid was repeated except for replacing the carbon black pigment with Pigment Red 122 (TONER MAGENTA E002 available from Clariant Japan KK). Thus, a magenta pigment dispersion liquid (having a solid pigment concentration of 15% by mass) was prepared.

<<Preparation of Yellow Pigment Dispersion Liquid>>

The procedure for preparing the black pigment dispersion liquid was repeated except for replacing the carbon black pigment with Pigment Yellow 74 (FAST YELLOW 531 available from Dainichiseika Color & Chemicals Mfg. Co., Ltd.). Thus, an yellow pigment dispersion liquid (having a solid pigment concentration of 15% by mass) was prepared.

<<Preparation of White Pigment Dispersion Liquid>>

First, 25 parts by mass of titanium oxide (STR-100W available from Sakai Chemical Industry Co., Ltd.), 5 parts by mass of a pigment dispersant (TEGO DISPERS 651 available from Evonik Japan Co., Ltd.), and 70 parts by mass of ion-exchange water were mixed. The resulting mixture was subjected to a dispersion treatment using a bead mill (RESEARCH LABO available from Shinmaru Enterprises Corporation) filled with zirconia beads having a diameter of 0.3 mm with a filling rate of 60% at a peripheral speed of 8 m/s for 5 minutes. Thus, a white pigment dispersion liquid (having a solid pigment concentration of 25% by mass) was prepared.

Preparation Example of Black Ink 1

First, 20% by mass of the black pigment dispersion liquid, 5% by mass (based on resin solid content) of the polycarbonate-based urethane resin emulsion (having a solid content of 30% by mass), 12% by mass of 1,2-propanediol, 5% by mass of 1,2-butanediol, 5% by mass of 3-methoxy-N,N-dimethylpropionamide (KJCMPA-100 available from KJ Chemicals Corporation), 0.1% by mass of a fluorine-based surfactant UNIDYNE DSN-403N (available from Daikin Industries, Ltd.), 0.1% by mass of a preservative PROXEL LV (available from AVECIA GROUP), and high-purity water in an amount such that the total percentage became 100% by mass were stir-mixed and thereafter filtered with a polypropylene filter having an average pore diameter of 0.2 gm. Thus, black ink 1 was prepared.

Preparation Example of Cyan Ink 1, Magenta Ink 1, and Yellow Ink 1

Cyan ink 1, magenta ink 1, and yellow ink 1 were each prepared in the same manner as the black ink 1 except for changing the ink composition according to Table 1. In Table 1, the compositions of the black ink 1, cyan ink 1, magenta ink 1, and yellow ink 1 were described.

TABLE 1

|  |  | Ink Compositions Ink No. | | | |
| --- | --- | --- | --- | --- | --- |
|  |  | Black Ink 1 | Cyan Ink 1 | Magenta Ink 1 | Yellow Ink 1 |
| Pigment | Black Pigment Dispersion Liquid | 20 | — | — | — |
|  | Cyan Pigment Dispersion Liquid | — | 20 | — | — |
|  | Magenta Pigment Dispersion Liquid | — | — | 20 | — |
|  | Yellow Pigment Dispersion Liquid | — | — | — | 20 |
| Resin Particles (Solid Basis) | Polycarbonate-based Urethane Resin Emulsion | 5 | 5 | 5 | 5 |
| Compound Represented by Formula (1) | 3-Methoxy-N,N-dimethylpropionamide | 5 | 6 | 5 | 6 |
| Organic Solvent | 1,2-Propanediol | 12 | 12 | 12 | 12 |
|  | 1,2-Butanediol | 5 | 5 | 5 | 5 |
| Common Components | Fluorine-based Surfactant UNIDYNE DSN-403N | 0.1 | 0.1 | 0.1 | 0.1 |
|  | PROXEL LV | 0.1 | 0.1 | 0.1 | 0.1 |
|  | High-purity Water | Residual Amount | Residual Amount | Residual Amount | Residual Amount |
|  | Total (% by mass) | 100 | 100 | 100 | 100 |

3-Methoxy-N,N-dimethylpropionamide (KJCMPA-100 available from KJ Chemicals Corporation, having a boiling point of 216° C.)

Preparation Example of White Inks 1 to 8

White inks 1 to 8 were each prepared in the same manner as the black ink 1 except for changing the ink composition according to Tables 2-1 or 2-2. In Tables 2-1 and 2-2, the compositions of the white inks 1 to 8 were described.

TABLE 2-1

|  |  | Ink Compositions White Ink No. | | | |
| --- | --- | --- | --- | --- | --- |
|  |  | 1 | 2 | 3 | 4 |
| Pigment | White Pigment Dispersion Liquid | 15 | 15 | 15 | 15 |
| Resin Particles (Solid Basis) | Polycarbonate-based Urethane Resin Emulsion | 10 | — | — | — |
|  | Polyether-based Urethane Resin Emulsion | — | 5 | — | 1.5 |
|  | Polyester-based Urethane Resin Emulsion | — | — | 7 | — |
| Compound Represented by Formula (1) | 3-Methoxy-N,N-dimethylpropionamide | 12 | 5 | — | 6 |
|  | 3-Butoxy-N,N-dimethylpropionamide | — | — | 8 | — |
| Organic Solvent | 1,2-Propanediol | 12 | 5 | 20 | 15 |
|  | 1,2-Butanediol | 5 | — | 12 | — |
| Common Components | Fluorine-based Surfactant UNIDYNE DSN-403N | 0.1 | 0.1 | 0.1 | 0.1 |
|  | PROXEL LV | 0.1 | 0.1 | 0.1 | 0.1 |
|  | High-purity Water | Residual Amount | Residual Amount | Residual Amount | Residual Amount |
|  | Total (% by mass) | 100 | 100 | 100 | 100 |

3-Methoxy-N,N-dimethylpropionamide (KJCMPA-100 available from KJ Chemicals Corporation, having a boiling point of 216° C.)
3-Butoxy-N,N-dimethylpropionamide (EQUAMIDE B100 available from Idemitsu Kosan Co., Ltd., having a boiling point of 252° C.)

TABLE 2-2

| | | Ink Compositions White Ink No. | | | |
|---|---|---|---|---|---|
| | | 5 | 6 | 7 | 8 |
| Pigment | White Pigment Dispersion Liquid | 15 | 15 | 15 | 15 |
| Resin Particles (Solid Basis) | Polycarbonate-based Urethane Resin Emulsion | — | — | 8 | 5 |
| | Polyether-based Urethane Resin Emulsion | — | 4 | — | — |
| | Polyester-based Urethane Resin Emulsion | 15 | — | — | — |
| Compound Represented by Formula (1) | 3-Methoxy-N,N-dimethylpropionamide | — | — | 2.5 | — |
| | 3-Butoxy-N,N-dimethylpropionamide | 10 | — | — | 13 |
| Organic Solvent | 1,2-Propanediol | 10 | 3 | 12 | 5 |
| | 1,2-Butanediol | 10 | 15 | 18 | 9 |
| Common Components | Fluorine-based Surfactant UNIDYNE DSN-403N | 0.1 | 0.1 | 0.1 | 0.1 |
| | PROXEL LV | 0.1 | 0.1 | 0.1 | 0.1 |
| | High-purity Water | Residual Amount | Residual Amount | Residual Amount | Residual Amount |
| | Total (% by mass) | 100 | 100 | 100 | 100 |

3-Methoxy-N,N-dimethylpropionamide (KJCMPA-100 available from KJ Chemicals Corporation, having a boiling point of 216° C.)
3-Butoxy-N,N-dimethylpropionamide (EQUAMIDE B100 available from Idemitsu Kosan Co., Ltd., having a boiling point of 252° C.)

Examples 1 to 8

<Printing>

The first mode (background-first, white undercoat, or front printing mode), illustrated in FIGS. 5A to 5F, in which the background image with white ink (the second image) is printed before the main image (the first image) is printed with color ink, was performed by a printer according to an embodiment of the present invention.

As the color ink, the above-prepared black ink 1, cyan ink 1, magenta ink 1, and yellow ink 1 were used. As the white ink, the above-prepared white inks 1 to 8 were used.

As a recording medium, a PET (polyethylene terephthalate) film (TP-188 available from KIMOTO Co., Ltd.) was used.

<Evaluation of Image Quality (Image Bleeding)>

The above-described printing operation was performed while adjusting the printing speed to highest level (10 m²/h), high level (8 m²/h), middle level (6 m²/h), low level (4 m²/h), or lowest level (2 m²/h). The degree of image bleeding was evaluated based on the following criteria. Results are presented in Table 3.

[Evaluation Criteria]

A+: No bleeding was confirmed with a magnifying glass (at a magnification of 20 times).
A: No bleeding was confirmed with visual observation.
B: Slight bleeding was confirmed.
C: Bleeding was confirmed.

<Discharge Reliability>

Discharge reliability was evaluated using an inkjet printer (modified machine of IPSIO GXe5500 available from Ricoh Co., Ltd.). Results are presented in Table 3.

First, the inkjet printer (modified machine of IPSIO GXe5500 available from Ricoh Co., Ltd.) was loaded with each of the white inks 1 to 8, and a nozzle check pattern was printed on a recording medium. As the recording medium, a PET (polyethylene terephthalate) film (TP-188 available from KIMOTO Co., Ltd.) was used.

In the printed nozzle check pattern, the number of portions where "nozzle omission" occurred was counted. Discharge reliability was evaluated based on the following criteria. Those ranked as A and B are preferred for practical use. Here, "nozzle omission" refers to a phenomenon in which an ink image is not normally formed due to an absence of ink discharge.

[Evaluation Criteria]

A: The number of portions where "nozzle omission" occurred was 1 or less.
B: The number of portions where "nozzle omission" occurred was 2.
C: The number of portions where "nozzle omission" occurred was 3 or more.

TABLE 3

| Example No. | White Ink No. | Image Quality Evaluation Printing Speed | | | | | Discharge Reliability |
|---|---|---|---|---|---|---|---|
| | | Highest | High | Middle | Low | Lowest | |
| 1 | 1 | A+ | A+ | A+ | A+ | A+ | A |
| 2 | 2 | A+ | A+ | A+ | A+ | A+ | B |
| 3 | 3 | B | A | A+ | A+ | A+ | A |
| 4 | 4 | B | A | A+ | A+ | A+ | A |
| 5 | 5 | A+ | A+ | A+ | A+ | A+ | B |
| 6 | 6 | B | A | A+ | A+ | A+ | A |
| 7 | 7 | A | A | A+ | A+ | A+ | A |
| 8 | 8 | A | A+ | A+ | A+ | A+ | B |

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

What is claimed is:

1. A printer comprising:
a liquid discharge head including a plurality of nozzles including:

a line of first nozzles to discharge first liquid to a recording medium; and a line of second nozzles to discharge second liquid to the recording medium; and a processor configured to change an area printable by one-pass scanning in a print mode in which a preceding image is formed on the recording medium with at least the first liquid and a subsequent image to be superimposed on the preceding image is formed with the second liquid;

wherein, to change the area printable by one-pass scanning, the processor is configured to change at least one of:

a number of nozzles used as the line of first nozzles or the line of second nozzles: and a number of nozzles that are not used as the line of first nozzles or the line of second nozzles in accordance with an amount of liquid applied to a recording medium to form the preceding image.

2. The printer according to claim 1, wherein the preceding image comprises:

a first image layer formed with the first liquid; and a second image layer formed with the second liquid, and wherein a subsequent image comprises a third image layer formed with the first liquid.

3. The printer according to claim 1, wherein the amount of liquid applied is one of an amount of liquid applied per unit area to form the preceding image and an amount of liquid applied to an entire print range to form the preceding image.

4. The printer according to claim 1, wherein the number of nozzles used as the line of first nozzles is either identical to or in relation of integral multiple with the number of nozzles used as the line of second nozzles.

5. The printer according to claim 1, wherein a number of nozzles used as the line of second nozzles is greater than a number of nozzles used as the line of first nozzles.

6. The printer according to claim 1, wherein the line of second nozzles is shifted from the line of first nozzles by at least a half of a length of the line of first nozzles in a nozzle array direction in which the line of first nozzles and the line of second nozzles extend.

7. The printer according to claim 1, wherein the line of first nozzles is disposed at each end of the line of second nozzles in a nozzle array direction in which the line of first nozzles and the line of second nozzles extend.

8. The printer according to claim 1, wherein the first liquid is used to form a main image and the second liquid is used to form a background, wherein the processor is configured to:

set the area printable by one-pass scanning when the preceding image is formed with the first liquid without the second liquid, and set the area printable by one-pass scanning to a second value less than the first when the preceding image is formed with the second liquid without the first liquid.

9. The printer according to claim 1, wherein the first liquid is a white ink including an organic solvent accounting for 15% to 35% by mass of the white ink.

10. The printer according to claim 9, wherein the white ink includes resin particles accounting for 2% to 10% by mass of the white ink.

11. The printer according to claim 9, wherein the white ink includes a compound represented by the following formula (1):

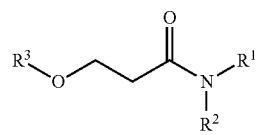

Formula (1)

where each of $R^1$, $R^2$, and $R^3$ independently represents an alkyl group having 1 to 5 carbon atoms.

12. The printer according to claim 11, wherein the compound represented by the formula (1) accounts for 3% to 12% by mass of the white ink.

13. A printing method comprising:

discharging first liquid from a line of first nozzles of a liquid discharge head and second liquid from a line of second nozzles of the liquid discharge head; and changing an area printable by one-pass scanning in a print mode in which a preceding image is formed with at least the first liquid and a subsequent image to be superimposed on the preceding image is formed with the second liquid, in accordance with an amount of liquid applied to a recording medium to form the preceding image.

14. The method according to claim 13, wherein the first liquid is a white ink including an organic solvent accounting for 15% to 35% by mass of the white ink.

15. The method according to claim 14, wherein the white ink includes resin particles accounting for 2% to 10% by mass of the white ink.

16. The method according to claim 14, wherein the white ink includes a compound represented by the following formula (1):

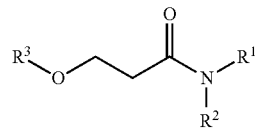

Formula (1)

where each of $R^1$, $R^2$, and $R^3$ independently represents an alkyl group having 1 to 5 carbon atoms.

17. The method according to claim 16, wherein the compound represented by the formula (1) accounts for 3% to 12% by mass of the white ink.

* * * * *